(12) United States Patent
Yamahara et al.

(10) Patent No.: US 6,373,542 B1
(45) Date of Patent: *Apr. 16, 2002

(54) LIQUID CRYSTAL DISPLAY DEVICE FREE FROM VIEWING-ANGLE-DEPENDENT COLORING OF AN IMAGE DISPLAYED ON LIQUID CRYSTAL ELEMENT

(75) Inventors: Motohiro Yamahara, Osaka; Shigeaki Mizushima, Ikoma, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/129,203

(22) Filed: Jul. 24, 1998

(30) Foreign Application Priority Data

Aug. 28, 1997 (JP) .............................. 9-233099

(51) Int. Cl.⁷ ..................... G02F 1/1335; G02F 1/1337
(52) U.S. Cl. ....................... 349/118; 349/129
(58) Field of Search ................... 349/129, 118

(56) References Cited

U.S. PATENT DOCUMENTS

| 5,506,706 A | | 4/1996 | Yamahara et al. | |
| 5,539,546 A | * | 7/1996 | Koden et al. | 349/155 |
| 5,844,619 A | * | 12/1998 | Yamahara et al. | 349/118 |
| 6,081,311 A | * | 6/2000 | Murai | 349/118 |
| 6,084,651 A | * | 7/2000 | Yamahara et al. | 349/118 |
| 6,144,431 A | * | 11/2000 | Yamahara et al. | 349/118 |

FOREIGN PATENT DOCUMENTS

| JP | 55-600 | | 1/1980 |
| JP | 56-97315 | | 8/1981 |
| JP | 57-186735 | | 11/1982 |
| JP | 05-215912 | | 8/1993 |
| JP | 05-313159 | | 11/1993 |
| JP | 06-118406 | | 4/1994 |
| JP | 06-194645 | | 7/1994 |
| JP | 07333617 | | 12/1995 |
| JP | 08-101381 | | 4/1996 |
| JP | 8-129180 | * | 5/1996 |

* cited by examiner

*Primary Examiner*—William L. Sikes
*Assistant Examiner*—Tarifur R. Chowdhury
(74) *Attorney, Agent, or Firm*—David G. Conlin; Williams J. Daley, Jr.; Dike, Bronstein, Roberts & Cushman

(57) ABSTRACT

A liquid crystal display device is provided with a liquid crystal display element, made up of a pair of electrode substrates and a liquid crystal layer filling a space therebetween; a pair of polarizing plates, one provided on each side of the liquid crystal display element; and at least one optical retardation plate, provided between the liquid crystal display element and one of the polarizing plates. Each optical retardation plate has negative anisotropy of the refractive index, and has an inclined index ellipsoid. In this liquid crystal display device, liquid crystal molecules of the liquid crystal layer are aligned in a different direction in each of a plurality of liquid crystal layer divisions of unequal area into which each pixel is divided, and respective extents of variation in response to wavelength of light of (i) anisotropy of the refractive index of the liquid crystal material of the liquid crystal layer and (ii) anisotropy of the refractive index of the optical retardation plate(s) are set to within a range such that viewing-angle-dependent coloring of the liquid crystal screen does not occur.

25 Claims, 11 Drawing Sheets

LIQUID CRYSTAL DISPLAY DEVICE FREE FROM VIEWING-ANGLE-DEPENDENT COLORING OF AN IMAGE DISPLAYED ON LIQUID CRYSTAL ELEMENT

FIELD OF THE INVENTION

The present invention relates to a liquid crystal display device, and in particular to a liquid crystal display device in which viewing angle dependence of the display screen is improved by combining a liquid crystal display element with an optical retardation plate.

BACKGROUND OF THE INVENTION

In the past, liquid crystal display devices using a nematic liquid crystal display element were widely used in numeral segment display devices in watches, calculators, etc., but recently, they have come to be used in devices such as word processors, laptop personal computers, and in-car liquid crystal televisions.

Generally, liquid crystal display elements include a transparent substrate, on which are provided electrode lines, etc. for turning the pixels on and off. For example, in an active matrix type liquid crystal display device, in addition to the electrode lines, active elements such as thin film transistors are provided on the substrate, as switching means for selective driving of pixel electrodes which apply a voltage to the liquid crystal. Further, in liquid crystal display devices capable of color display, color filter layers of, for example, red, green, and blue, are also provided on the substrate.

With regard to liquid crystal display methods used in liquid crystal display elements of this type, different methods are selected, as needed, depending on the twist angle of the liquid crystal. Two well-known examples are the twisted nematic liquid crystal display method (hereinafter referred to as the "TN method"), which is an active driving method, and the super twisted nematic liquid crystal display method (hereinafter referred to as the "STN method"), which is a multiplexing driving method.

In the TN method, nematic liquid crystal molecules are aligned in an arrangement twisted 90°, and display is performed by guiding light along the direction of twist. The STN method, on the other hand, makes use of the fact that, by expanding the twist angle of the liquid crystal molecules to more than 90°, light transmittance changes abruptly around the liquid crystal's applied voltage threshold.

Since the STN method makes use of the birefringence effect of the liquid crystal, color interference causes the background of the display screen to have a distinctive color. To remedy this kind of shortcoming and perform black-and-white display using the STN method, it is considered effective to use an optical compensation plate. Display methods which use an optical compensation plate can be broadly divided into the double-layered super twisted nematic phase compensation method (hereinafter referred to as the "D-STN method") and the film-type phase compensation method (hereinafter referred to as the "film provision method"), in which a film having optical anisotropy is provided.

The D-STN method uses a two-layer structure of a liquid crystal cell for display and another liquid crystal cell in a twisted alignment with a twist angle of a direction opposite that of the liquid crystal cell for display. The film provision method, on the other hand, uses a structure provided with a film having optical anisotropy. From the point of view of weight and cost, the film provision method is considered superior. Since black-and-white display characteristics have been improved by adopting phase compensation methods of this type, color STN liquid crystal display devices have also been realized, which enable color display by providing a color filter layer in a display device using the STN method.

The TN method, on the other hand, can be broadly divided into normally-black and normally-white methods. In the normally-black method, two polarization plates are arranged so that their directions of polarization are mutually parallel, and black is displayed when an ON voltage is not applied to the liquid crystal (OFF state). In the normally-white method, two polarization plates are arranged so that their directions of polarization are mutually perpendicular, and white is displayed in the OFF state. From the points of view of display contrast, color repeatability, dependence of display on viewing angle, etc., the normally-white method is superior.

However, with TN liquid crystal display devices, since the liquid crystal molecules have anisotropy of the refractive index $\Delta n$, and since the liquid crystal molecules are aligned so as to tilt with respect to the upper and lower substrates, the contrast of the display image varies according to the direction and angle from which it is viewed; thus viewing angle dependence is large.

FIG. 12 schematically shows the structure of a TN liquid crystal display element 31 in cross-section. The Figure shows a state in which a voltage for display of a gray shade is being applied, and the liquid crystal molecules 32 are tilted up slightly. In the TN liquid crystal display element 31, a linearly polarized light ray 35, traveling in the normal direction of the surfaces of substrates 33 and 34, and linear polarized light rays 36 and 37 traveling at an incline with respect to the normal angle, cross the liquid crystal molecules 32 at different respective angles. Since the liquid crystal molecules 32 have anisotropy of the refractive index $\Delta n$, the linearly polarized light rays 35, 36, and 37 of each direction, in passing among the liquid crystal molecules 32, produce ordinary light and extraordinary light, and due to a difference in phase thereof, the linearly polarized light rays 35, 36, and 37 are converted into elliptically polarized light. This is the cause of viewing angle dependence.

Further, in an actual liquid crystal layer, the angle of tilt of liquid crystal molecules 32 around the midpoint between the substrates 33 and 34 differs from that of the liquid crystal molecules in the vicinity of either substrate 33 or 34, and the liquid crystal molecules 32 are also twisted 90° along the axis of the normal direction.

For these reasons, in passing among the liquid crystal molecules 32, the linearly polarized light rays 35, 36, and 37 are subject to various birefringence effects depending on their direction and angle of travel, and show a complex viewing angle dependence.

Specifically, viewing angle dependence is evident as phenomena such as the following. As viewing angle is gradually inclined in the standard viewing angle direction (below the normal direction of the display screen), above a certain angle from the normal direction, phenomena occur such as coloring of the display image (hereinafter referred to as "coloring phenomenon") and reversal of black and white (hereinafter referred to as "reversal phenomenon"). Again, as viewing angle is gradually inclined in the opposite viewing angle direction (above the normal direction of the display screen), contrast is drastically impaired.

Further, the foregoing liquid crystal display device has the problem that, as the size of the display screen is increased, the viewing angle field is decreased. If a large liquid crystal display screen is viewed at close range from directly in front of the screen, there are cases in which viewing angle dependence causes colors in the upper and lower parts of the display screen to appear to differ. This is because the actual angles of view needed to view peripheral portions of the screen are increased, which is equivalent to viewing the screen from a more inclined viewing angle.

In order to improve this kind of viewing angle dependence, Japanese Unexamined Patent Publication Nos. 55-600/1980 (Tokukaisho 55-600) and 56-97318/1981 (Tokukaisho 56-97318), for example, have proposed insertion of an optical retardation plate (optical retardation film), as an optical element having optical anisotropy, between a liquid crystal display element and one of the polarizing plates.

In this method, light which has been converted from linearly polarized to elliptically polarized light by passing among the liquid crystal molecules (which have anisotropy of the refractive index) passes through an optical retardation plate. Consequently, the difference in phase between ordinary light and extraordinary light which arises depending on viewing angle is compensated, and the elliptically polarized light is re-converted into linearly polarized light. Thus viewing angle dependence is improved.

Japanese Unexamined Patent Publication No. 5-313159/1993 (Tokukaihei 5-313159) discloses an example of this kind of optical retardation plate, in which one of the principal refractive index directions of the index ellipsoid is parallel to the normal direction of the surface of the optical retardation plate. However, use of this optical retardation plate results in only limited improvement of reversal phenomenon in the standard viewing angle direction.

For this reason, U.S. Pat. No. 5,506,706 (corresponding to Japanese Unexamined Patent Publication No. 6-75116/1994 (Tokukaihei 6-75116)) proposes a method which uses an optical retardation plate in which one of the principal refractive index directions of the index ellipsoid inclines with respect to the normal direction of the surface of the optical retardation plate. In this method, one of the following two types of optical retardation plate is used.

One of these is an optical retardation plate in which, of the three principal refractive indices of the index ellipsoid, the direction of the smallest principal refractive index is parallel to the surface of the plate, the direction of one of the two remaining principal refractive indices inclines at an angle of θ with respect to the normal direction of the surface of the plate, and the direction of the other principal refractive index also inclines at an angle of θ with respect to the normal direction of the surface of the plate. Here, the value of θ satisfies the relation $20° \leq \theta \leq 70°$.

The other type of optical retardation plate is one in which the three principal refractive indices $n_a$, $n_b$, and $n_c$ of the index ellipsoid satisfy the relation $n_a = n_c > n_b$, and the direction of the principal refractive index $n_b$, which is parallel to the normal direction of the surface of the plate, and the direction of the principal refractive index $n_c$ or $n_a$, which is in-plane with respect to the surface of the plate, incline in a clockwise or counter-clockwise direction with respect to an axis which is the direction of the principal refractive index $n_a$ or $n_c$. In other words, the index ellipsoid inclines.

With respect to the first of the foregoing two types of optical retardation plate, either a uniaxial or biaxial plate may be used. Again, with the second type, a single plate may be used alone, or two such plates may be combined, with the respective principal refractive indices $n_b$ thereof inclining 90° with respect to one another.

In a liquid crystal display device structured so that at least one such optical retardation plate with an inclined index ellipsoid is provided between a liquid crystal display element and a polarizing plate, change in contrast, coloring phenomenon, and reversal phenomenon, which occur depending on viewing angle, can be improved over an optical retardation plate in which a principal refractive index direction of the index ellipsoid does not incline with respect to the normal direction of the surface of the plate.

In addition, various techniques for resolving reversal phenomenon have been proposed, such as the so-called pixel division method disclosed in Japanese Unexamined Patent Publication No. 57-186735/1982 (Tokukaisho 57-186735), in which each display pattern (pixel) is divided into a plurality of portions, and alignment control is performed so that each portion has independent viewing angle characteristics. With this method, since the liquid crystal molecules tilt up in a different direction in each portion, viewing angle dependence when viewing angle is inclined upwards or downwards can be improved.

Further, Japanese Unexamined Patent Publication Nos. 6-118406/1994 (Tokukaihei 6-118406) and 6-194645/1994 (Tokukaihei 6-194645) disclose techniques for combining the foregoing pixel division method with use of an optical retardation plate.

The liquid crystal display device disclosed in Japanese Unexamined Patent Publication No. 6-118406/1994 aims for improvement of contrast, etc. by providing an optical anisotropic film (optical retardation plate) between a liquid crystal panel and a polarizing plate. Again, a compensation plate (optical retardation plate) disclosed in Japanese Unexamined Patent Publication No. 6-194645/1994 is set so as to have almost no in-plane refractive index (in a direction parallel to the surface of the compensation plate), and so that the refractive index in a direction perpendicular to the surface of the compensation plate is smaller than the in-plane refractive index. Accordingly, this compensation plate has a negative refractive index. For this reason, the positive refractive index arising in the liquid crystal display element when a voltage is applied can be compensated, and viewing angle dependence reduced.

However, today, when liquid crystal display devices with a wider viewing angle field and better display quality are called for, further improvement of viewing angle dependence is needed. Accordingly, use of an optical retardation plate with an inclined index ellipsoid, like that in the foregoing U.S. Pat. No. 5,506,706 (Japanese Unexamined Patent Publication No. 6-75116/1994), is not always sufficient, and there is still room for improvement.

Further, although the foregoing pixel division method for resolving reversal phenomenon is admittedly able to do so when the viewing angle is inclined up or down, at that time, contrast is impaired, and black display takes on a white cast, thus appearing gray. A further drawback is that viewing angle dependence arises when the viewing angle is inclined to the left or right.

Again, with the foregoing method for combining pixel division with use of an optical retardation plate, when viewing angle is inclined, coloring phenomenon occurs at an incline of 45°. Further, since the foregoing method uses a liquid crystal display element in which each pixel is divided into two divisions of equal area, there is limited suppression of impairment of contrast when the viewing angle is inclined up or down. This is due to the following reason.

With the foregoing pixel division method, since each pixel is divided into two divisions of equal area, viewing angle characteristics in the standard viewing angle direction (the direction in which, when viewed from a direction perpendicular to the screen, display contrast improves) and in the opposite viewing angle direction (the direction in which, when viewed from a direction perpendicular to the screen, display contrast worsens) are equalized. However, since actual viewing angle characteristics in the standard viewing angle direction are opposite from those in the opposite viewing angle direction, even if use of an optical retardation plate is combined with pixel division, it is difficult to uniformly suppress impairment of contrast when viewing angle is inclined up or down. When viewing angle is inclined in the standard viewing angle direction, in particular, reversal phenomenon and blacking out of the screen tend to occur.

SUMMARY OF THE INVENTION

The object of the present invention is to further improve viewing angle dependence beyond the compensation effect of an optical retardation plate having an inclined index ellipsoid, and, in particular, to minimize reversal phenomenon occurring when viewing angle is inclined in the upper or lower direction, to uniformly suppress the impairment of contrast and the tendency for a displayed image to appear in white which occur in such a situation, and to effectively improve coloring phenomenon.

In order to attain the foregoing object, a liquid crystal display device according to the present invention is made up of a liquid crystal display element which includes a pair of transparent substrates provided, on respective facing surfaces thereof, with transparent electrodes and alignment layers, and a liquid crystal layer filling a space between the transparent substrates; a pair of polarizers, one provided on each side of the liquid crystal display element; and at least one optical retardation plate, provided between the liquid crystal display element and one of the polarizers, which has an inclined index ellipsoid; in which the alignment films align the liquid crystal in a different direction in each of a plurality of liquid crystal layer divisions of unequal area into which each pixel is divided, and respective extents of variation in response to wavelength of light of (i) anisotropy of the refractive index of a liquid crystal material of the liquid crystal layer and (ii) anisotropy of the refractive index of the optical retardation plate(s) are set to within a range such that viewing-angle-dependent coloring of the liquid crystal screen does not occur.

With the foregoing structure, when linearly polarized light passes through the liquid crystal layer having birefringence, ordinary light and extraordinary light are produced, thus converting the linearly polarized light into elliptically polarized light, but the linearly polarized light is compensated by the optical retardation plate having an inclined index ellipsoid.

However, when further improvement of viewing angle dependence is called for, it is not necessarily sufficient to rely solely on the foregoing compensation effect. Accordingly, as a result of further research, the inventors found that viewing-angle-dependent coloring of the liquid crystal screen is influenced by the respective extents of variation in response to wavelength of light of (i) anisotropy of the refractive index of the liquid crystal material of the liquid crystal layer and (ii) anisotropy of the refractive index of the optical retardation plate.

For this reason, in the liquid crystal display device having the present structure, the respective extents of variation in response to wavelength of light of (i) anisotropy of the refractive index of the liquid crystal material of the liquid crystal layer and (ii) anisotropy of the refractive index of the optical retardation plate are set to within a range such that viewing-angle-dependent coloring of the liquid crystal screen does not occur.

By this means, in the foregoing liquid crystal display device, coloring of the screen can be better prevented, and contrast fluctuation and reversal phenomenon can also be improved beyond the compensation effect of the optical retardation plate alone.

Further, the liquid crystal display device according to the present structure uses a divided liquid crystal layer, in which the liquid crystal layer in each pixel is divided into two divisions of unequal area, in each of which the liquid crystal molecules are aligned in a different direction.

By this means, in the foregoing liquid crystal display device, the difference between the opposite viewing angle characteristics in the standard and opposite viewing angle directions can be eliminated, and viewing angle characteristics in both viewing angle directions can be brought into closer conformity. Consequently, in the foregoing liquid crystal display device, impairment of contrast and the tendency for the displayed image to appear in white, which occur when the viewing angle is inclined upward or downward, can be suppressed nearly uniformly, and black, especially, can be displayed more clearly.

Further, in order to attain the foregoing object, a liquid crystal display device according to a second structure of the present invention is made up of a liquid crystal display element, which includes a pair of transparent substrates, provided with, on respective facing surfaces thereof, transparent electrodes and alignment films, and a layer of liquid crystal, aligned with a 90° twist, filling a space between the transparent substrates; a pair of polarizers, one provided on each side of the liquid crystal display element; and at least one optical retardation plate, provided between the liquid crystal display element and one of the polarizers, having an index ellipsoid whose three principal refractive indices $n_a$, $n_b$, and $n_c$ have a relation $n_a = n_c > n_b$, the index ellipsoid inclining because the directions of (a) the principal refractive index $n_b$, which is parallel to the normal direction of the surface of the optical retardation plate, and (b) the principal refractive index $n_c$ or $n_a$, which is in-plane with respect to the surface of the optical retardation plate, incline in a clockwise or counter-clockwise direction with respect to an axis which is the direction of the refractive index $n_a$ or $n_c$; in which the alignment films align the liquid crystal in a different direction in each of a plurality of liquid crystal layer divisions of unequal area into which each pixel is divided, and respective extents of variation in response to wavelength of light of (i) anisotropy of the refractive index of a liquid crystal material of the liquid crystal layer and (ii) anisotropy of the refractive index of the optical retardation plate(s) are set to within a range such that viewing-angle-dependent coloring of the liquid crystal screen does not occur.

With the foregoing structure, when linearly polarized light passes through the liquid crystal layer having birefringence, ordinary light and extraordinary light are produced, thus converting the linearly polarized light into elliptically polarized light, but the linearly polarized light is compensated by the optical retardation plate, which has principal refractive indices $n_a$, $n_b$, and $n_c$ fulfilling the relation $n_a = n_c > n_b$, and an index ellipsoid whose short axis, which includes the principal refractive index $n_b$, inclines with respect to the normal direction of the optical retardation plate.

However, when further improvement of viewing angle dependence is called for, it is not necessarily sufficient to rely solely on the foregoing compensation effect. Accordingly, as a result of further research, the inventors found that viewing-angle-dependent coloring of the liquid crystal screen is influenced by the respective extents of variation in response to wavelength of light of (i) anisotropy of the refractive index of the liquid crystal material of the liquid crystal layer and (ii) anisotropy of the refractive index of the optical retardation plate.

For this reason, in the liquid crystal display device having the present structure, the respective extents of variation in response to wavelength of light of (i) anisotropy of the refractive index of the liquid crystal material of the liquid crystal layer and (ii) anisotropy of the refractive index of the optical retardation plate are set to within a range such that viewing-angle-dependent coloring of the liquid crystal screen does not occur.

By this means, in the foregoing liquid crystal display device, coloring of the screen can be better prevented, and contrast fluctuation and reversal phenomenon can also be improved beyond the compensation effect of the optical retardation plate alone.

Further, the liquid crystal display device according to the present structure uses a divided liquid crystal layer, in which the liquid crystal layer in each pixel is divided into two divisions of unequal area, in each of which the liquid crystal molecules are aligned in a different direction.

By this means, in the foregoing liquid crystal display device, the difference between the opposite viewing angle characteristics in the standard and opposite viewing angle directions can be eliminated, and viewing angle characteristics in both viewing angle directions can be brought into closer conformity. Consequently, in the foregoing liquid crystal display device, impairment of contrast and the tendency for the displayed image to appear in white, which occur when the viewing angle is inclined upward or downward, can be suppressed nearly uniformly, and black, especially, can be displayed more clearly.

The following will concretely specify, in the liquid crystal display devices having the first and second structures above, the range of the extents of variation within which viewing-angle-dependent coloring of the liquid crystal screen does not occur. Namely, a ratio $\Delta n_L(450)/\Delta n_L(550)$, which is a ratio of $\Delta n_L(450)$, anisotropy of the refractive index of the liquid crystal material of the liquid crystal layer in response to light of 450 nm wavelength, to $\Delta n_L(550)$, anisotropy of the refractive index of the liquid crystal material in response to light of 550 nm wavelength; and a ratio $\Delta n_F(450)/\Delta n_F(550)$, which is a ratio of $\Delta n_F(450)$, anisotropy of the refractive index of the optical retardation plate(s) in response to light of 450 nm wavelength, to $\Delta n_F(550)$, anisotropy of the refractive index of the optical retardation plate(s) in response to light of 550 nm wavelength, are set so as to satisfy:

$$0 \leq \frac{(\Delta n_L(450)/\Delta n_L(550)) - 1}{(\Delta n_F(450)/\Delta n_F(550)) - 1} < 0.25$$

Alternatively, a ratio $\Delta n_L(650)/\Delta n_L(550)$, which is a ratio of $\Delta n_L(650)$, anisotropy of the refractive index of the liquid crystal material of the liquid crystal layer in response to light of 650 nm wavelength, to $\Delta n_L(550)$, anisotropy of the refractive index of the liquid crystal material in response to light of 550 nm wavelength; and a ratio $\Delta n_F(650)/\Delta n_F(550)$, which is a ratio of $\Delta n_F(650)$, anisotropy of the refractive index of the optical retardation plate(s) in response to light of 650 nm wavelength, to $\Delta n_F(550)$, anisotropy of the refractive index of the optical retardation plate(s) in response to light of 550 nm wavelength, are set so as to satisfy:

$$0 \leq \frac{(\Delta n_L(650)/\Delta n_L(550)) - 1}{(\Delta n_F(650)/\Delta n_F(550)) - 1} < 0.25$$

If at least one of the foregoing ranges is used, the liquid crystal display device according to the present invention will show slight coloring at a viewing angle of 50°, which is the viewing angle field required of ordinary liquid crystal display devices, but will be satisfactory for use when viewed from whatever direction.

In a liquid crystal display device with a wider viewing angle field of 70°, it is preferable to set the range of the extents of variation so as to satisfy:

$$0 \leq \frac{(\Delta n_L(450)/\Delta n_L(550)) - 1}{(\Delta n_F(450)/\Delta n_F(550)) - 1} \leq 0.17$$

or so as to satisfy:

$$0 \leq \frac{(\Delta n_L(650)/\Delta n_L(550)) - 1}{(\Delta n_F(650)/\Delta n_F(550)) - 1} \leq 0.18$$

By using at least one of the foregoing ranges, the liquid crystal display device according to the present invention will show no coloring at a viewing angle of 70°, which is the viewing angle field required of wide viewing angle field liquid crystal display devices, when viewed from whatever direction.

Further, in the liquid crystal display devices having the first and second structures above, it is preferable to set $\Delta n_L(550)$, which is the anisotropy of the refractive index of the liquid crystal material of the liquid crystal layer in response to light of 550 nm wavelength, within a range of more than 0.060 and less than 0.120.

This is because, depending on the viewing angle direction, reversal phenomenon, impairment of the contrast ratio, etc. were found to occur when $\Delta n_L(550)$, the anisotropy of the refractive index of the liquid crystal material in response to light of 550 nm wavelength (the central range of the visible light range) was set to 0.060 or less, or to 0.120 or more. Accordingly, in the foregoing liquid crystal display devices, by setting $\Delta n_L(550)$, the anisotropy of the refractive index of the liquid crystal material in response to light of 550 nm wavelength, within a range of more than 0.060 and less than 0.120, phase differences corresponding to viewing angle which arise in the liquid crystal display element can be resolved, and thus not only coloring phenomenon occurring in the liquid crystal screen depending on viewing angle, but also contrast fluctuation, reversal phenomenon in the right and left viewing angle directions, etc. can be further improved.

In this case, in the foregoing liquid crystal display devices, it is more preferable to set $\Delta n_L(550)$, which is the anisotropy of the refractive index of the liquid crystal material of the liquid crystal layer in response to light of 550 nm wavelength, within a range of more than 0.070 and less than 0.095.

By this means, in the foregoing liquid crystal display devices, phase differences corresponding to viewing angle which arise in the liquid crystal display element can be resolved more effectively, and thus contrast fluctuations, reversal phenomenon in the right and left directions, and coloring phenomenon can be improved with certainty.

Further, in the liquid crystal display devices having the first and second structures above, it is preferable to set the angle of inclination of the index ellipsoid of each optical retardation plate within a range of 15° through 75°.

By setting the angle of inclination of the index ellipsoid of each optical retardation plate provided in the liquid crystal display device within a range of 15° through 75°, the aforementioned effect of the optical retardation plate, of compensating the phase difference, can be obtained with certainty.

Further, in the liquid crystal display devices having the first and second structures above, it is preferable if, in each optical retardation plate, $(n_a-n_b) \times d$, which is a product of a difference between the principal refractive indices $n_a$ and $n_b$ and the thickness d of the optical retardation plate, is set within a range from 80 nm through 250 nm.

By setting $(n_a-n_b) \times d$, which is a product of a difference between the principal refractive indices $n_a$ and $n_b$ and the thickness d of the optical retardation plate, within a range from 80 nm through 250 nm for each optical retardation plate provided in the liquid crystal display device, the aforementioned effect of the optical retardation plate, of compensating the phase difference, can be obtained with certainty.

Further, in the liquid crystal display devices having the first and second structures above, it is preferable if each optical retardation plate is provided such that, in the largest of the liquid crystal layer divisions in a given pixel, the direction in which the liquid crystal molecules in the vicinity of the inner surface of the alignment film incline when a voltage is applied by the transparent electrodes is opposite the direction of incline of the index ellipsoid.

In the foregoing structure, if, in the largest of the liquid crystal layer divisions in a given pixel, the direction of incline of the index ellipsoid of the optical retardation plate is opposite to the direction of incline of the liquid crystal molecules when a voltage is applied, the optical characteristics due to the liquid crystal molecules can be set opposite to the optical characteristics due to the index ellipsoid, i.e., due to the optical retardation plate. Accordingly, in the foregoing liquid crystal display devices, the optical retardation plate can compensate the bias in optical characteristics which arises since the liquid crystal molecules near the inner surface of the alignment film do not tilt up even when a voltage is applied.

By this means, reversal phenomenon when the viewing angle is inclined in the standard viewing angle direction can be suppressed, and a good display image, which will not black out, can be obtained. Further, impairment in contrast when the viewing angle is inclined in the opposite viewing angle direction can be suppressed, and thus a good display image, which will not appear in white, can be obtained. Moreover, reversal phenomenon in the right and left viewing angle directions can be suppressed.

Further, in the liquid crystal display devices having the first and second structures above, when the liquid crystal layer divisions are a first liquid crystal layer division and a second liquid crystal layer division, it is preferable if the ratio in size of the first liquid crystal layer division to the second liquid crystal layer division is set within a range from 6:4 through 19:1.

By this means, in a liquid crystal display device having the foregoing structure with an index ellipsoid with a specific direction of inclination, viewing angle characteristics can be further improved.

In this case, by setting the ratio in size of the first liquid crystal layer division to the second liquid crystal layer division within a range from 7:3 through 9:1, viewing angle characteristics of the foregoing liquid crystal display devices can be improved so as to obtain good viewing angle characteristics which are balanced in the upper and lower viewing angle directions.

Additional objects, features, and strengths of the present invention will be made clear by the description below. Further, the advantages of the present invention will be evident from the following explanation in reference to the drawings.

DESCRIPTION OF THE EMBODIMENTS

The following will explain one embodiment of the present invention with reference to FIGS. 1 through 11.

Figure 1:
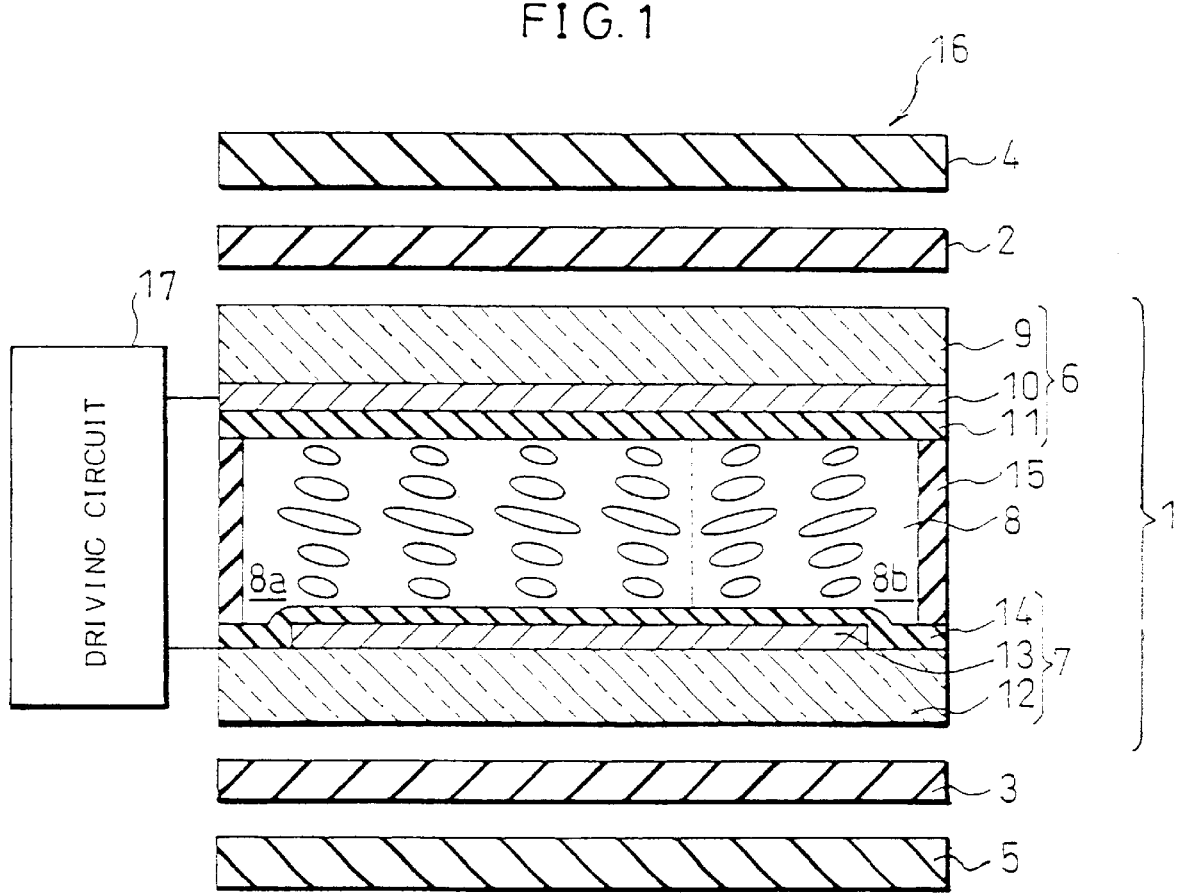
FIG. 1 is an exploded cross-sectional view showing the structure of a liquid crystal display device according to one embodiment of the present invention.

As shown in FIG. 1, a liquid crystal display device according to the present embodiment includes a liquid crystal display element 1, a pair of optical retardation plates 2 and 3, and a pair of polarizing plates 4 and 5 (polarizers).

The liquid crystal display element 1 is made up of electrode substrates 6 and 7 provided opposite one another, with a liquid crystal layer 8 filling a space therebetween. In the electrode substrate 6, on a surface of a glass substrate 9 (transparent substrate) which faces the liquid crystal layer 8 are provided a transparent electrode 10, made of ITO (Indium Tin Oxide), and an alignment film 11, in that order. In the electrode substrate 7, on a surface of a glass substrate 12 (transparent substrate) which faces the liquid crystal layer 8 are provided a transparent electrode 13, made of ITO, and an alignment film 14, in that order.

For the sake of simplicity, FIG. 1 shows the structure of one pixel. In the entirety of the liquid crystal display element 1, transparent electrodes 10 and 13 in the shape of bands of a predetermined width are provided at predetermined intervals on the transparent substrates 9 and 12, respectively, so as to run perpendicular to one another when viewed from a direction perpendicular to the surface of a substrate. An area where a transparent electrode 10 and a transparent electrode 13 cross corresponds to one pixel for performing display, and these pixels are provided in a matrix arrangement throughout the entirety of the present liquid crystal display device.

The electrode substrates 6 and 7 are attached together by seal resin 15, and the space bounded by the electrode substrates 6 and 7 and the seal resin 15 is filled with the liquid crystal layer 8. A voltage based on display data from a driving circuit 17 is applied to the liquid crystal layer 8 through the transparent electrodes 10 and 13.

In the present liquid crystal display device, a unit made up of the liquid crystal display element 1, the optical retardation plates 2 and 3, and the polarizing plates 4 and 5 is a liquid crystal cell 16.

Figure 2:
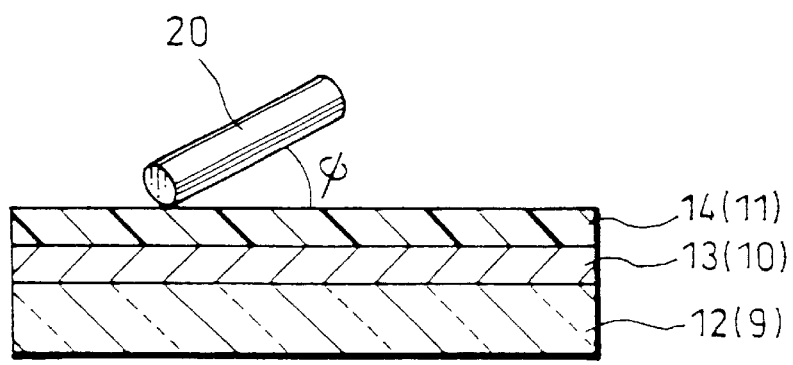
FIG. 2 is an explanatory drawing showing pre-tilt angle, which is an angle formed by the longitudinal axis of a liquid crystal molecule and the alignment film.

Each of the alignment films 11 and 14 has two domains with different states of alignment. For this reason, the state of alignment of the liquid crystal molecules of the liquid crystal layer 8 is controlled so as to be different in a first division 8a (liquid crystal layer division; first liquid crystal layer division) and a second division 8b (liquid crystal layer division; second liquid crystal layer division), which face the two foregoing domains. The alignment films 11 and 14 give the liquid crystal molecules different states of alignment by applying a different pre-tilt angle to the liquid crystal molecules in the two foregoing domains, by reversing the pre-tilt direction along a plane perpendicular to the surface of the substrate, etc. Pre-tilt angle, as shown in FIG. 2, is the angle $\phi$ formed by the longitudinal axis of a liquid crystal molecule 20 and the alignment film 14 (or 11), and is determined by the combination of the rubbing of the alignment films 11 and 14 with the liquid crystal material.

Further, as will be discussed in detail below, in the liquid crystal display device according to the present embodiment, in order to improve viewing angle characteristics when the viewing angle is inclined vertically or horizontally, the two divisions into which the liquid crystal layer 8 is divided are unequal in area.

The optical retardation plates 2 and 3 are provided between the liquid crystal display element and the polarizing plates 4 and 5, respectively. The optical retardation plates 2 and 3 are made up of a supporting body made of a transparent organic polymer, coated with discotic liquid crystal, which is aligned in an inclined or hybrid alignment, and then crosslinked with the supporting body. By this means, the index ellipsoid (to be discussed below) of each optical retardation plate 2 and 3 is provided so as to incline with respect to the surface of the plate.

As the supporting body for the optical retardation plates 2 and 3, triacetyl cellulose (TAC), generally used for polarizing plates, is suitable, and has good reliability. Alternatively, an organic polymer film with superior environmental and chemical resistance, such as polycarbonate (PC), polyethylene terephthalate (PET), etc., is suitable.

Figure 3:
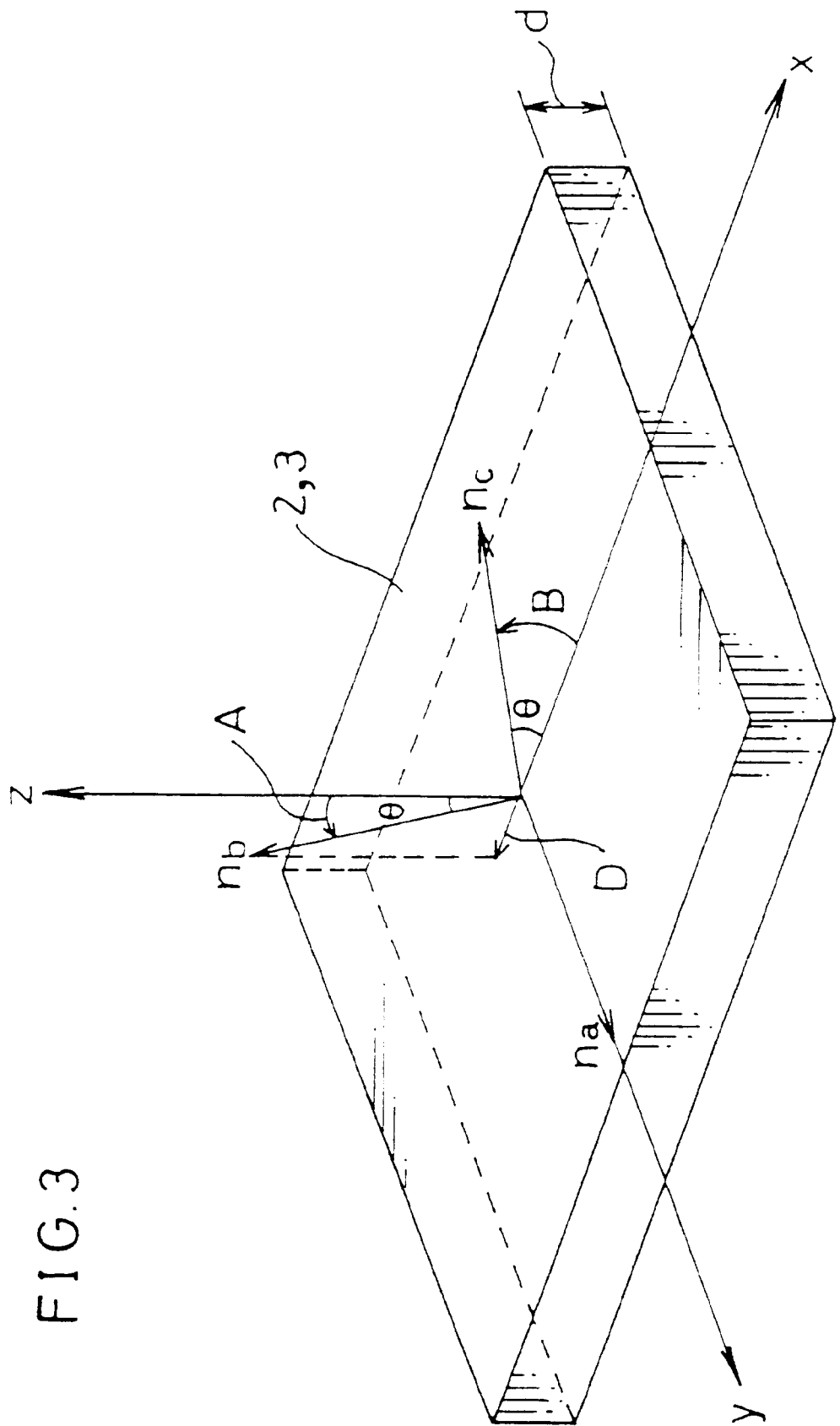
FIG. 3 is a perspective view showing principal refractive indices of an optical retardation plate of the foregoing liquid crystal display device.

As shown in FIG. 3, each of the optical retardation plates 2 and 3 has three principal refractive indices $n_a$, $n_b$, and $n_c$, each of a different direction. Of three axes x, y, and z at right angles to each other, the direction of the principal refractive index $n_a$ coincides with the direction of the y axis. With respect to the z axis (the normal direction of the surface of the optical retardation plate 2 or 3 corresponding to the screen), which is perpendicular to the surface, the direction of the principal refractive index $n_b$ inclines $\theta$ in the direction of the arrow A. With respect to the x axis (the surface), the direction of the principal refractive index $n_c$ inclines $\theta$ in the direction of the arrow B.

In the optical retardation plates 2 and 3, the three principal refractive indices satisfy the relation $n_a=n_c>n_b$. For this reason, since there is only one optical axis, the optical retardation plates 2 and 3 are uniaxial, and anisotropy of the refractive index is negative. In each of the optical retardation plates 2 and 3, since $n_a=n_c$, a first retardation value $(n_c-n_a) \times d$ is close to 0 nm. A second retardation value $(n_c-n_b) \times d$ is set to a desired value within a range from 80 nm through 250 nm. By setting the second retardation value $(n_c-n_b) \times d$ within this range, the function of the optical retardation plates 2 and 3, of compensating the phase difference, can be obtained with certainty. The foregoing $n_c-n_a$ and $n_c-n_b$ represent anisotropy of the refractive index $\Delta n$, and d is the thickness of the optical retardation plate 2 or 3.

Generally, in optical anisotropic bodies such as liquid crystal and optical retardation plates (optical retardation films), the foregoing principal refractive indices $n_a$, $n_c$, and $n_b$ in three dimensions are shown as an index ellipsoid. Anisotropy of the refractive index $\Delta n$ is a value which varies according to the direction from which the index ellipsoid is viewed.

Further, in the optical retardation plates 2 and 3, the angle $\theta$ by which the principal refractive index $n_b$ inclines, i.e., the angle $\theta$ by which the index ellipsoid inclines, is set to a desired value within a range of $15° \leq \theta \leq 75°$. By setting the angle of incline $\theta$ within this range, the function of the optical retardation plates 2 and 3, of compensating the phase difference, can be obtained with certainty, regardless of whether the direction of incline of the index ellipsoid is clockwise or counter-clockwise.

Further, in the liquid crystal display device according to the present embodiment, with, as discussed above, the liquid crystal layer 8 divided into a first division 8a and a second division 8b, respective extents of variation in response to wavelength of light of (i) anisotropy of the refractive index $\Delta n$ of the liquid crystal material of the liquid crystal layer and (ii) anisotropy of the refractive index $\Delta n$ of the optical retardation plate are set to within a range such that viewing-angle-dependent coloring of the liquid crystal screen does not occur.

As will be discussed in detail below, by using a combination of optical retardation plates 2 and 3 and a liquid crystal layer 8 able to satisfy the foregoing range, the function of the optical retardation plates 2 and 3, of compensating the phase difference, can be effectively implemented.

Incidentally, with regard to the arrangement of the optical retardation plates 2 and 3, a structure in which only one of the optical retardation plates 2 and 3 is provided, or one in which both optical retardation plates 2 and 3 are layered on one side of a liquid crystal display element, are also possible. Further, three or more optical retardation plates may also be used.

Figure 4:
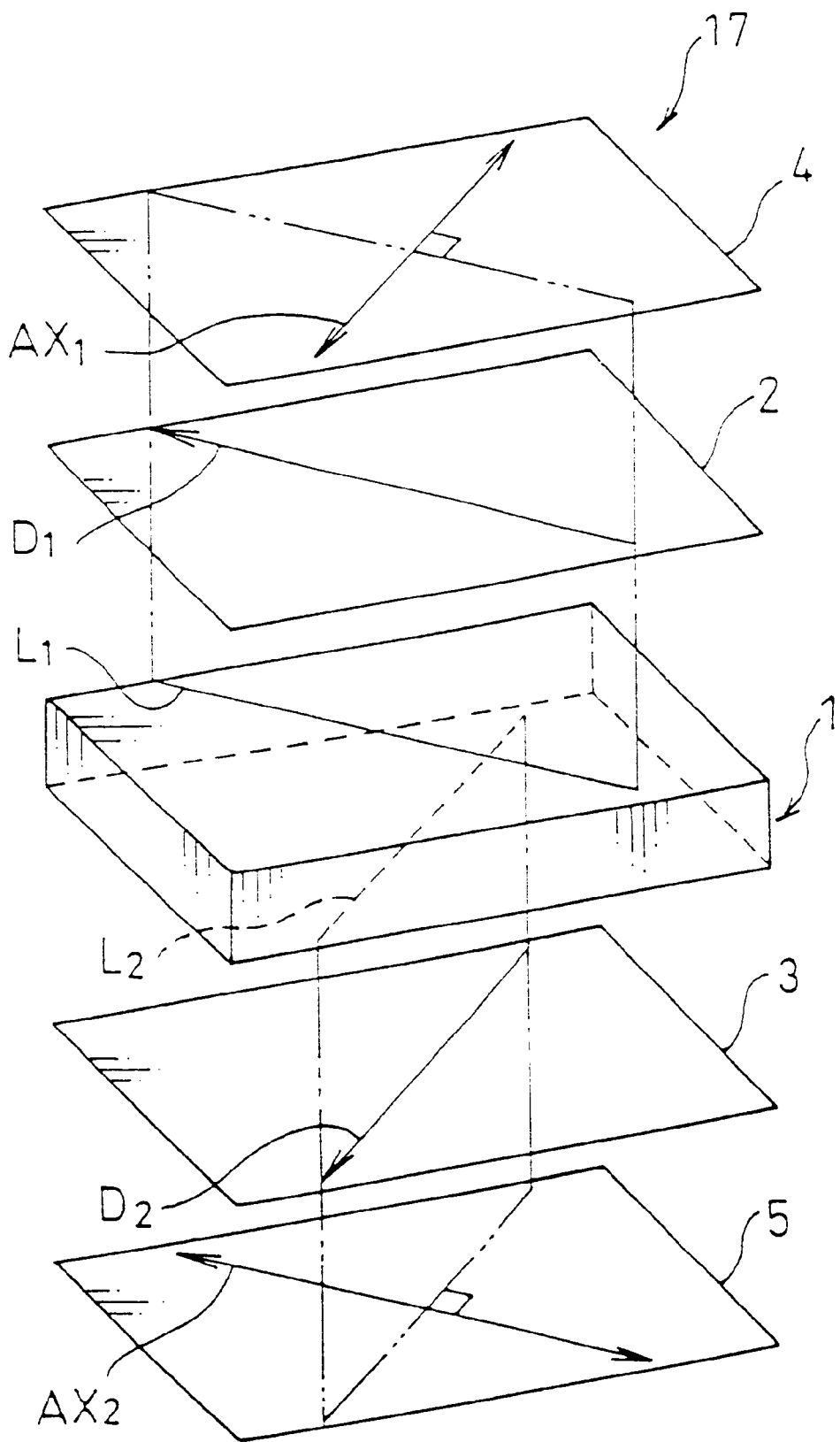
FIG. 4 is an exploded perspective view showing the optical arrangement of a polarizing plate and the optical retardation plate of the foregoing liquid crystal display device.

As shown in FIG. 4, in the present liquid crystal display device, the polarizing plates 4 and 5 of the liquid crystal display element 1 are provided such that their respective absorption axes $AX_1$ and $AX_2$ are perpendicular to longitudinal axes $L_1$ and $L_2$ of liquid crystal molecules in contact with the alignment films 11 and 14 (see FIG. 1), respectively. In the present liquid crystal display device, since the respective longitudinal axes $L_1$ and $L_2$ are perpendicular to each other, the respective absorption axes $AX_1$ and $AX_2$ are also perpendicular to each other.

Here, as shown in FIG. 3, the direction of the principal refractive index $n_b$ inclined in the direction in which the optical retardation plate 2 or 3 is to be given anisotropy, projected onto the surface of the optical retardation plate 2 or 3, will be denoted by D. As shown in FIG. 4, the optical retardation plate 2 is provided such that the direction D thereof (direction $D_1$) is parallel to the longitudinal axis $L_1$, and the optical retardation plate 3 is provided such that the direction D thereof (direction $D_2$) is parallel to the longitudinal axis $L_2$.

Due to the foregoing arrangement of the optical retardation plates 2 and 3 and the polarizing plates 4 and 5, the present liquid crystal display device performs so-called normally-white display, in which light is transmitted, thus displaying white, in the OFF state.

The following will explain in detail the above-mentioned division of the liquid crystal layer 8.

As mentioned above, in the liquid crystal layer 8, in order to improve viewing angle characteristics when the viewing angle is inclined vertically or horizontally, the liquid crystal in each pixel is divided into a first division 8a and a second division 8b of unequal area. Specifically, the ratio in area of the first division 8a to the second division 8b is set within a range from 6:4 through 19:1.

Figure 5:
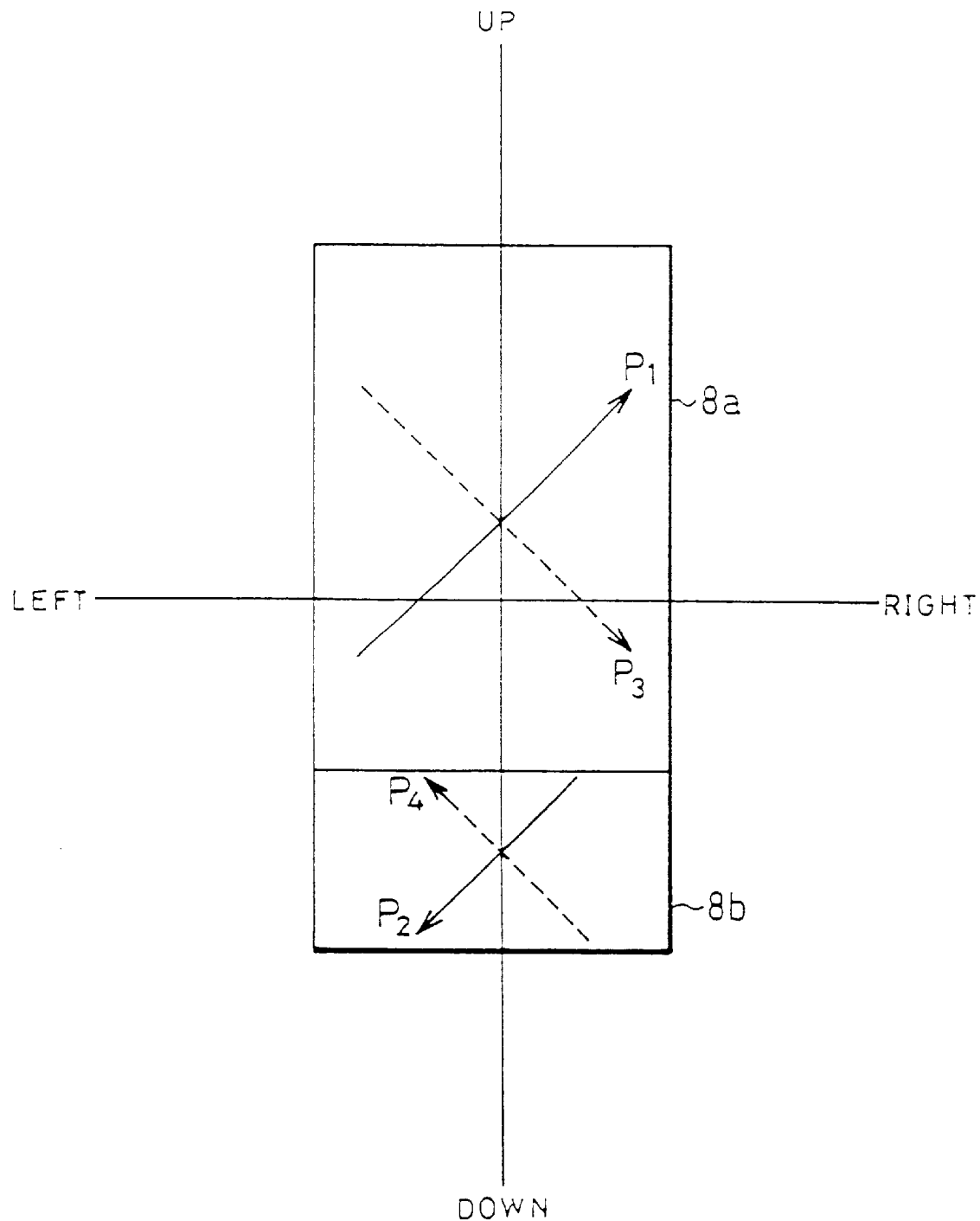
FIG. 5 is an explanatory drawing showing a pre-tilt direction of liquid crystal molecules in one pixel provided in the foregoing liquid crystal display device.

Further, as shown in FIG. 5, within each of the first and second divisions 8a and 8b, the alignment film 11 aligns the liquid crystal molecules in a pre-tilt direction perpendicular to that in which the alignment film 14 aligns the liquid crystal molecules. In the alignment film 11, pre-tilt directions $P_1$ and $P_2$ of the first division 8a and the second division 8b, respectively, are set so as to be mutually opposite in direction. In the alignment film 14, pre-tilt directions $P_3$ and $P_4$ of the first division 8a and the second division 8b are also set so as to be mutually opposite in direction. Incidentally, the liquid crystal layer 8 may be divided in the longitudinal direction of either the transparent electrodes 10 or the transparent electrodes 13.

By combining the liquid crystal display element 1 having a liquid crystal layer 8 of this kind with the optical retardation plates 2 and 3, a state of alignment can be obtained which is suited to viewing angle characteristics in both the standard and opposite viewing angle directions. By this means, impairment of contrast and the tendency for the displayed image to appear in white, which occur when the viewing angle is inclined upward or downward, can be suppressed. As a result, black, which is particularly prone to influence by impaired contrast, can be displayed clearly and more truly black.

Further, in the liquid crystal display element 1, it is even more preferable to set the direction of inclination of the index ellipsoid with respect to the optical retardation plate 2 or 3 so as to be opposite the pre-tilt direction of the liquid crystal molecules in the vicinity of the alignment film 11 or 14, respectively.

By this means, the optical retardation plates 2 and 3 can compensate bias in optical characteristics caused by the liquid crystal molecules, which, due to the influence of the alignment film, are in a tilted state during application of a voltage to the liquid crystal display element 1.

As a result, reversal phenomenon when viewing angle is inclined in the standard viewing angle direction can be suppressed, and a good display image not prone to blacking out can be obtained. Further, since impairment of contrast when viewing angle is inclined in the opposite viewing angle direction is suppressed, a good display image which will not appear in white can be obtained. In addition, it is also possible to suppress reversal phenomenon when the viewing angle is inclined to the right or left.

Further, in order to attain an optimum combination of the liquid crystal layer 8 and the function of the optical retardation plates 2 and 3 of compensating the phase difference, respective extents of variation in response to wavelength of light of (i) anisotropy of the refractive index Δn of the liquid crystal material of the liquid crystal layer 8 and (ii) anisotropy of the refractive index An of the optical retardation plates 2 and 3 are set within a range such that viewing-angle-dependent coloring of the liquid crystal screen does not occur.

Specifically, it is sufficient if a combination of the optical retardation plates 2 and 3 and the liquid crystal material is used which satisfies the conditions for setting the range in at least one of (1) and (2) below. The setting ranges in (1) and (2) below are common to all of the divisions into which the liquid crystal layer 8 is divided with the ratio mentioned above.

(1) A ratio $\Delta n_L(450)/\Delta n_L(550)$, which is a ratio of $\Delta n_L(450)$, anisotropy of the refractive index of the liquid crystal material of the liquid crystal layer 8 in response to light of 450 nm wavelength, to $\Delta n_L(550)$, anisotropy of the refractive index of the liquid crystal material in response to light of 550 nm wavelength; and a ratio $\Delta n_F(450)/\Delta n_F(550)$, which is a ratio of $\Delta n_F(450)$, the anisotropy of the refractive index of the optical retardation plates 2 and 3 in response to light of 450 nm wavelength, to $\Delta n_F(550)$, anisotropy of the refractive index of the optical retardation plates in response to light of 550 nm wavelength, are set so as to satisfy:

$$0 \leq \frac{(\Delta n_L(450)/\Delta n_L(550)) - 1}{(\Delta n_F(450)/\Delta n_F(550)) - 1} < 0.25$$

Or, more preferably:

$$0 \leq \frac{(\Delta n_L(450)/\Delta n_L(550)) - 1}{(\Delta n_F(450)/\Delta n_F(550)) - 1} \leq 0.17$$

(2) A ratio $\Delta n_L(650)/\Delta n_L(550)$, which is a ratio of $\Delta n_L(650)$, anisotropy of the refractive index of the liquid crystal material of the liquid crystal layer 8 in response to light of 650 nm wavelength, to $\Delta n_L(550)$, anisotropy of the refractive index of the liquid crystal material in response to light of 550 nm wavelength; and a ratio $\Delta n_F(650)/\Delta n_F(550)$, which is a ratio of $\Delta n_F(650)$, anisotropy of the refractive index of the optical retardation plates 2 and 3 in response to light of 650 nm wavelength, to $\Delta n_F(550)$, anisotropy of the refractive index of the optical retardation plates 2 and 3 in response to light of 550 nm wavelength, are set so as to satisfy:

$$0 \le \frac{(\Delta n_L(650)/\Delta n_L(550))-1}{(\Delta n_F(650)/\Delta n_F(550))-1} < 0.25$$

Or, more preferably:

$$0 \le \frac{(\Delta n_L(650)/\Delta n_L(550))-1}{(\Delta n_F(650)/\Delta n_F(550))-1} \le 0.18$$

By using a liquid crystal material and optical retardation plates designed to satisfy at least one of the foregoing (1) and (2), the function of the optical retardation plates 2 and 3, of compensating the phase difference, can improve contrast fluctuation and reversal phenomenon arising depending on the angle from which the display screen is viewed, and, in particular, can effectively improve coloring phenomenon arising depending on the angle from which the display screen is viewed.

To explain in detail, by satisfying the wider range in at least one of (1) and (2) above, a liquid crystal display device can be obtained which, at the 50° viewing angle required of ordinary liquid crystal display devices, is fully acceptable for use when viewed from whatever direction, although there is some coloring.

Further, by satisfying the more preferable range in at least one of (1) and (2) above, a liquid crystal display device can be obtained in which, at a 70° viewing angle, there is no coloring when viewed from whatever direction.

In addition, by satisfying at least one of (1) and (2) above, contrast fluctuation and reversal phenomenon can be improved more than when relying only on the compensation effect of the optical retardation plates 2 and 3.

Figure 6:
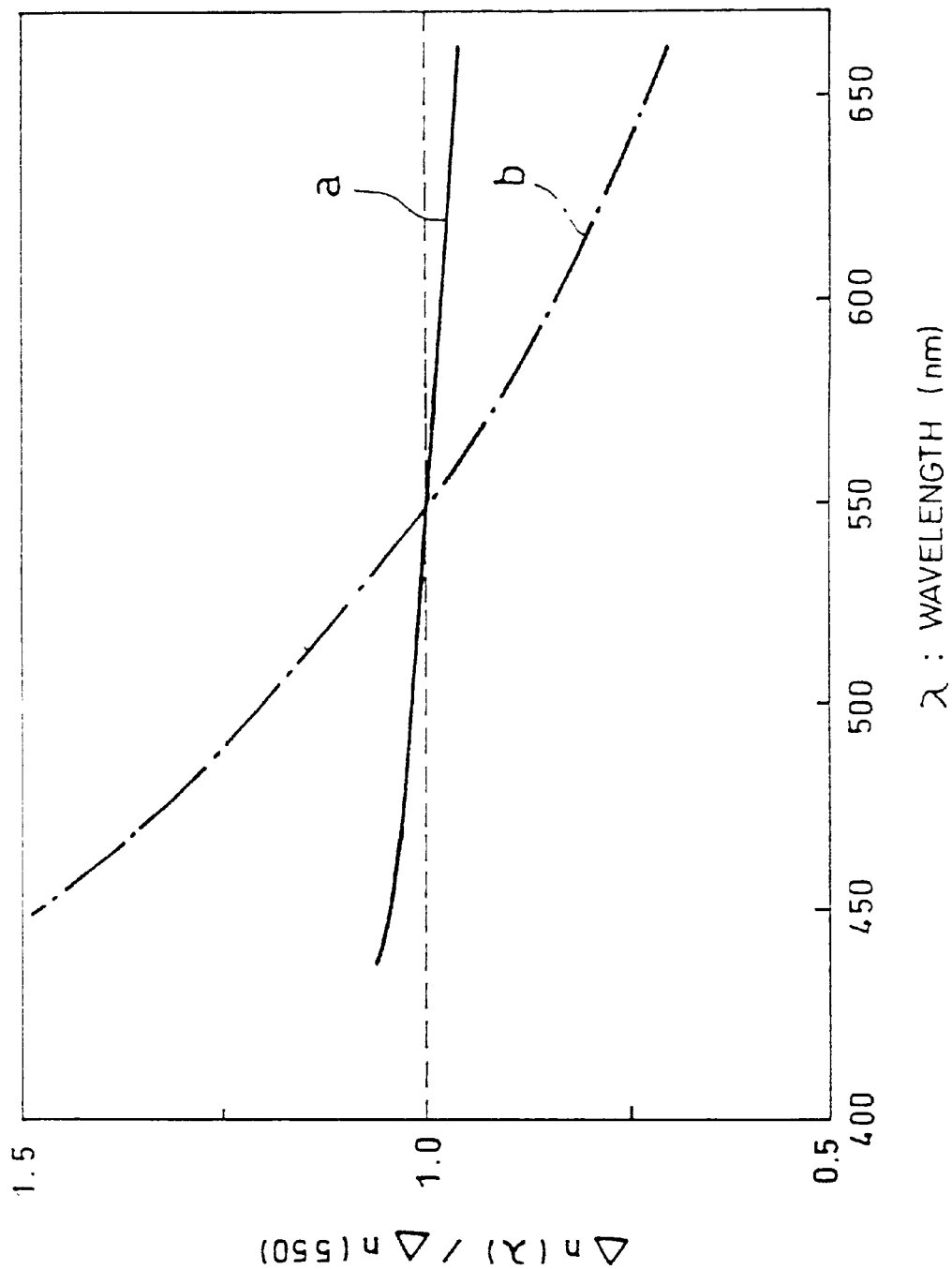
FIG. 6 is a graph showing $\Delta n(\lambda)/\Delta n(550)$ by wavelength for one liquid crystal material and one optical retardation plate used in the foregoing liquid crystal display device.

FIG. 6 shows $\Delta n(\lambda)/\Delta n(550)$ by light wavelength ($\lambda$) for one liquid crystal material which may be used in the liquid crystal layer 8 and for one optical retardation plate which may be used for the optical retardation plates 2 and 3 of the present liquid crystal display device. Curve a, shown by a solid line, is $\Delta n(\lambda)/\Delta n(550)$ by light wavelength ($\lambda$) for one liquid crystal material, and curve b, shown by a dot-and-dash line, is $\Delta n(\lambda)/\Delta n(550)$ by light wavelength ($\lambda$) for one optical retardation plate.

Further, in the liquid crystal display device according to the present embodiment, it is preferable to use for the liquid crystal layer 8 a liquid crystal material in which anisotropy of the refractive index in response to light of 550 nm wavelength $\Delta n_L(550)$ is more than 0.060 and less than 0.120, or more preferably, one in which $\Delta n_L(550)$ is more than 0.070 and less than 0.095.

By this means, it is possible to further improve impairment of contrast in the opposite viewing angle direction, and reversal phenomenon in the right and left directions, beyond the effect of the optical retardation plates 2 and 3 of compensating the phase difference and the compensation effect obtained by setting respective extents of variation in response to wavelength of light of (i) anisotropy of the refractive index $\Delta n$ of the liquid crystal material of the liquid crystal layer 8 and (ii) anisotropy of the refractive index $\Delta n$ of the optical retardation plates 2 and 3 within one of the foregoing ranges.

As discussed above, the liquid crystal display device according to the present embodiment is provided with two optical retardation plates 2 and 3, between the liquid crystal display element 1 and the polarizing plates 4 and 5, respectively. Each of the optical retardation plates 2 and 3 has a index ellipsoid whose three principal refractive indices $n_a$, $n_b$, and $n_c$ have a relation $n_a = n_c > n_b$, and the direction of the principal refractive index $n_b$ inclines with respect to the normal direction of the surface. In the foregoing liquid crystal display device, the liquid crystal layer 8 in each pixel is divided into two divisions of unequal area, in each of which the liquid crystal molecules are aligned in a different direction, and respective extents of variation in response to wavelength of light of (i) anisotropy of the refractive index $\Delta n$ of the liquid crystal material of the liquid crystal layer 8 and (ii) anisotropy of the refractive index $\Delta n$ of the optical retardation plate are set within a range such that viewing-angle-dependent coloring of the liquid crystal screen does not occur.

Thus, due to the function of the optical retardation plates 2 and 3 of compensating the phase difference, corresponding to viewing angle, which occurs in the liquid crystal display element 1; the compensation effect of dividing the liquid crystal layer 8; and the compensation function performed by setting respective extents of variation in response to wavelength of light of (i) anisotropy of the refractive index $\Delta n$ of the liquid crystal material of the liquid crystal layer 8 and (ii) anisotropy of the refractive index $\Delta n$ of the optical retardation plates 2 and 3 within one of the foregoing ranges (ranges within which the compensation effect of the optical retardation plates attains an optimum combination), reversal phenomenon occurring, in particular, when the viewing angle is inclined upward or downward can be suppressed, impairment of contrast and the tendency of the displayed image to appear in white in such a case can be suppressed nearly uniformly, and viewing-angle-dependent coloring of the display image can be improved particularly effectively, and thus a high-quality image can be displayed.

Incidentally, the present embodiment explained an example of a liquid crystal display device which performs normally-white display, but effects equivalent to those above can also be obtained with a liquid crystal display device which performs normally-black display, by dividing the liquid crystal layer 8 as explained above, and making use of the compensation function of the optical retardation plates 2 and 3 and the compensation function performed by setting respective extents of variation in response to wavelength of light of (i) anisotropy of the refractive index $\Delta n$ of the liquid crystal material of the liquid crystal layer 8 and (ii) anisotropy of the refractive index $\Delta n$ of the optical retardation plates 2 and 3 within a range at which viewing-angle-dependent coloring of the liquid crystal screen does not occur.

Further, the present embodiment explained a simple-matrix-type liquid crystal display device, but the present invention can also be applied to an active-matrix-type liquid crystal display device which uses active switching elements such as TFTs.

Next, a more detailed example of a liquid crystal display device according to the present embodiment will be explained, along with a comparative example.

EXAMPLE 1

Figure 7:
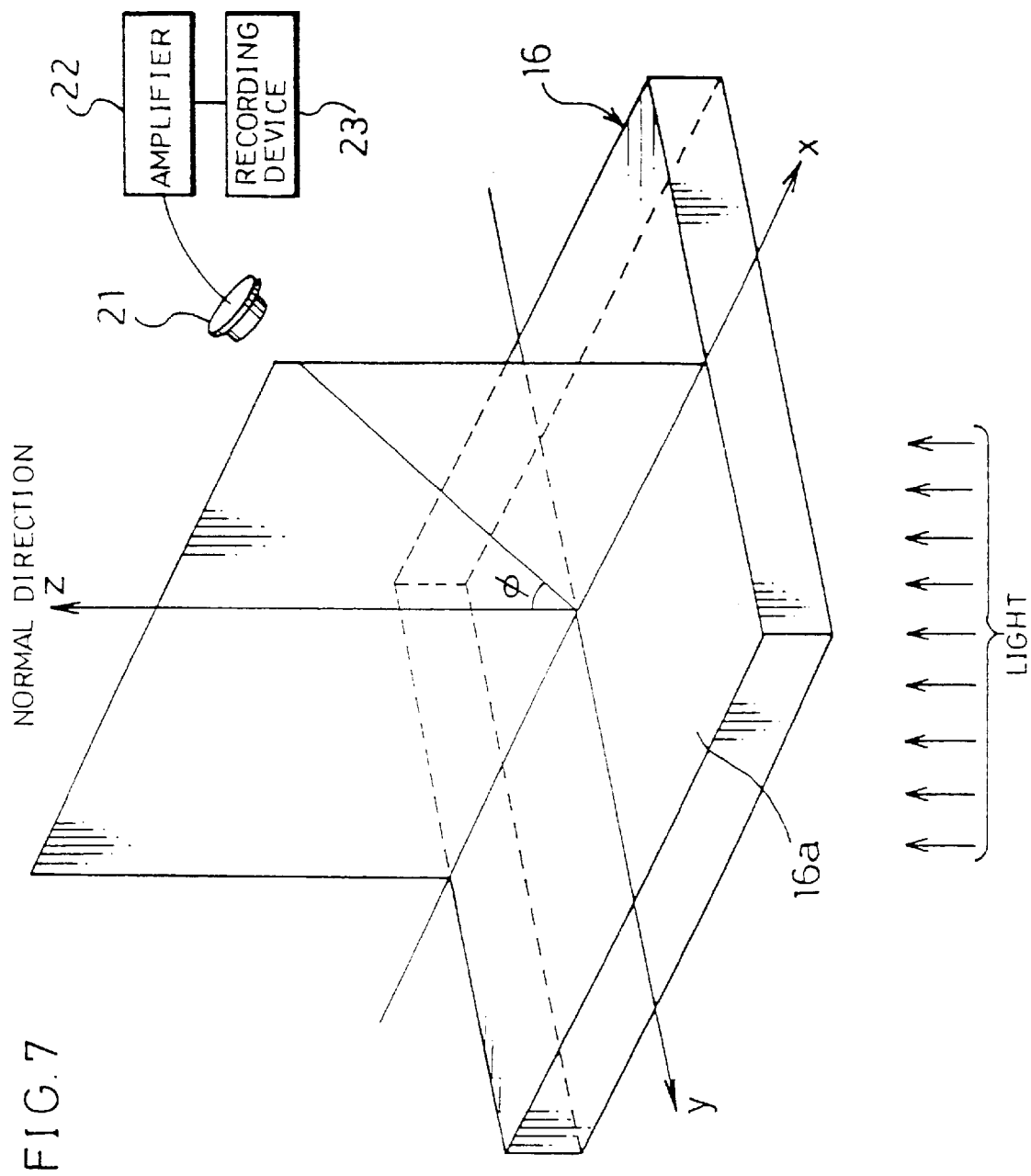
FIG. 7 is a perspective view showing a measurement system for measuring viewing angle dependence in the foregoing liquid crystal display device.
Figure 8:
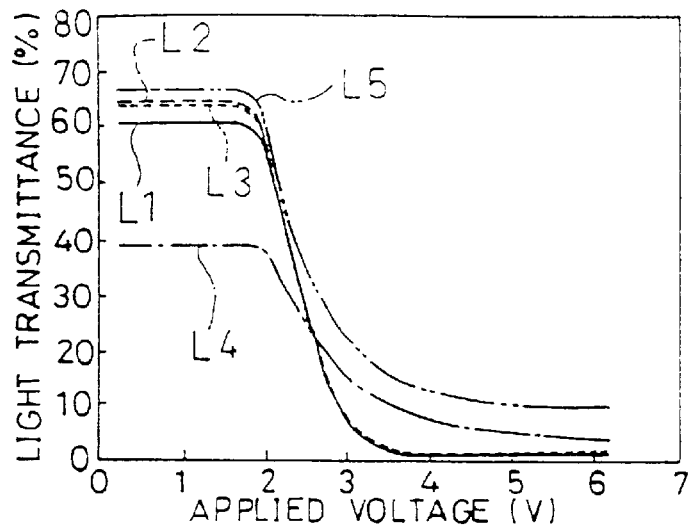
FIGS. 8(a), 8(b), and 8(c) are graphs showing light transmittance/applied voltage characteristics of liquid crystal display devices according to Example 1 having liquid crystal layer alignment division ratios of 6:4, 17:3, and 19:1, respectively.
Figure 8:
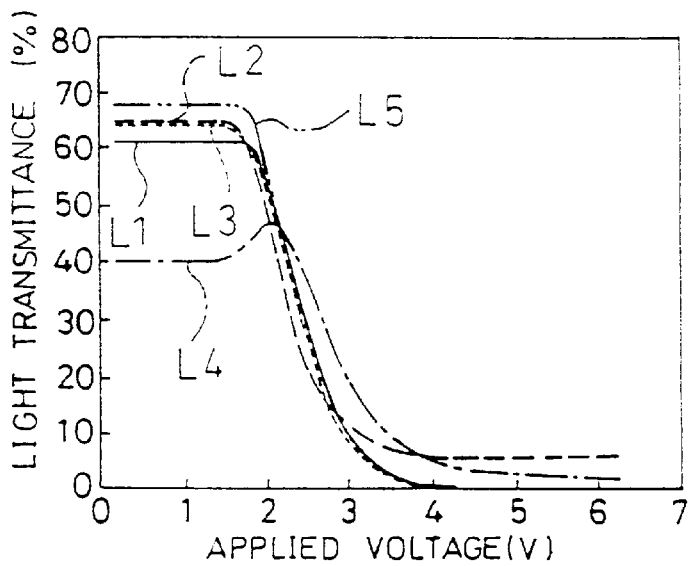
Figure 8:
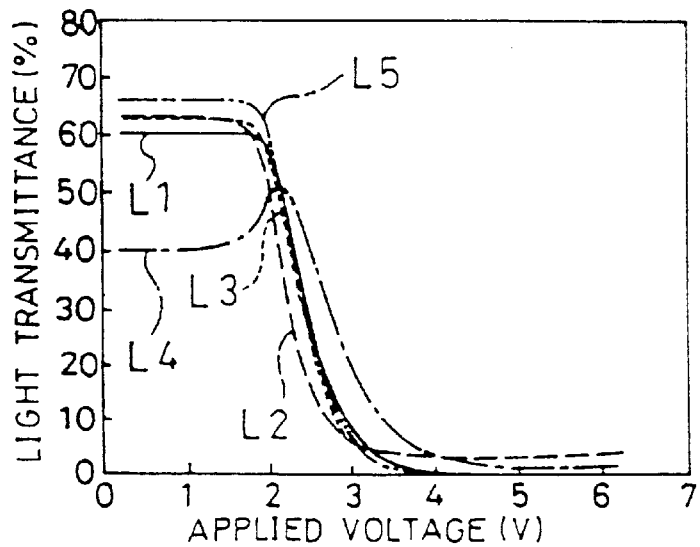

In the present example, viewing angle dependence of a liquid crystal display device was measured using a measurement system like that shown in FIG. 7, made up of a photodetector 21, an amplifier 22, and a recording device 23. The liquid crystal cell 16 is positioned so that its upper surface 16a (the glass substrate 9 side) coincides with a standard plane x-y of three mutually perpendicular axes xyz. The photodetector 21 is an element capable of detecting light at a fixed solid light receiving angle, and is positioned a predetermined distance from the intersection of the axes in a direction which forms an angle (viewing angle) of $\phi$ with respect to the z direction, which is perpendicular to the surface 16a.

During measurement, after placing the liquid crystal cell 16 in the measurement system, monochromatic light of 550 nm wavelength is projected onto the surface of the liquid crystal cell 16 opposite the surface 16a. Part of the monochromatic light which passes through the liquid crystal cell 16 is projected into the photodetector 21. Output from the photodetector 21, after being amplified to a predetermined level by the amplifier 22, is recorded in the recording device 23, which is a device such as a wave-form memory or a recorder.

Here, samples #1 through #3 were prepared, using, in the liquid crystal cell 16 of the liquid crystal display device shown in FIG. 1, alignment films 11 and 14 made of Nippon Synthetic Rubber Co. product Optomer-AL, and using in the liquid crystal layer 8 liquid crystal materials with ratios in area of the first division 8a to the second division 8b of 6:4, 17:3, and 19:1, respectively, and a cell gap (thickness of the liquid crystal layer 8) of 5 $\mu$m.

In samples #1 through #3, the optical retardation plates 2 and 3 used were formed by coating a transparent supporting body such as triacetyl cellulose (TAC) with discotic liquid crystal, aligning the discotic liquid crystal molecules in an inclined alignment, and cross-linking them to the supporting body. In the optical retardation plates 2 and 3 used, the above-mentioned first and second retardation values were 0 nm and 100 nm, respectively. In the optical retardation plates 2 and 3 used, further, the direction of the principal refractive index $n_b$ inclined, with respect to the z axis of the three axes xyz shown in FIG. 3, by approximately 20° in the direction of the arrow A; and the direction of the principal refractive index $n_c$ inclined, with respect to the x axis, by approximately 20° in the direction of the arrow B (i.e., the angle of incline θ of the index ellipsoid was approximately 20°).

Each of the foregoing samples #1 through #3 was placed in the measurement system shown in FIG. 7, and, with the photodetector 21 secured at a fixed angle φ, output level of the photodetector 21 in response to a voltage applied to each sample #1 through #3 was measured.

Assuming that the y direction is the top of the screen, and the x direction the left side of the screen, measurement was performed with the photodetector 21 positioned in an upper direction, in a lower direction, to the left, and to the right, with the angle φ of the photodetector 21 fixed at 30°. In addition, measurement was also performed with the photodetector 21 positioned in the direction of the z axis.

The results of measurement are shown in FIGS. 8(a) through 8(c). FIGS. 8(a) through 8(c) are graphs showing light transmittance according to voltage applied (light transmittance/applied voltage characteristics) for samples #1 through #3. FIG. 8(a) shows the results of measurement of sample #1, with a division ratio of 6:4; FIG. 8(b) shows the results of measurement of sample #2, with a division ratio of 17:3; FIG. 8(c) shows the results of measurement of sample #3, with a division ratio of 19:1.

In FIGS. 8(a) through 8(c), curve L1, shown by a solid line, shows the characteristics in the z axis direction; curve L2, shown by a dashed line, shows the characteristics in the lower direction; curve L3, shown by a dotted line, shows the characteristics to the right; curve L4, shown by a dot-and-dash line, shows the characteristics in the upper direction; and curve L5, shown by a two-dot-and-dash line, shows the characteristics to the left.

As can be seen from FIG. 8(b), in sample #2, with a division ratio of 17:3, with regard to light transmittance/applied voltage characteristics in the gray shade display range, the curves L2, L3, L4, and L5 are close to curve L1. For this reason, in the gray shade display range, substantially equivalent viewing angle characteristics can be obtained whether the viewing angle is inclined toward the top, bottom, right, or left.

In the ON state, measurement in the lower direction found that light transmittance was maintained at a low fixed value of around 7%, and no reversal phenomenon was evident. Again, in the ON state, measurement in the upper direction found a lower light transmittance than that in the lower direction, confirming that light transmittance was sufficiently decreased.

With samples #1 and #3, shown in FIGS. 8(a) and 8(c), respectively, improvement of viewing angle characteristics substantially equivalent to that above was found.

Specifically, as shown in FIG. 8(a), when the division ratio is 6:4, curve L2 (lower direction) and curve L4 (upper direction) begin to approach one another in gray shade display and in the ON state, and this tendency intensifies as the division ratio is increased. On the other hand, as shown in FIG. 8(c), when the division ratio is 19:1, curve L2 (lower direction) and curve L1 (z axis direction) begin to approach one another, and this tendency intensifies as the division ratio is decreased. For this reason, in the lower direction (standard viewing angle direction), blacking out of the display image can be suppressed.

Moreover, as a result of investigation of small variations in the division ratio, it was found that when the division ratio was set within a range from 7:3 through 9:1, good improvement of viewing angle characteristics, which was balanced in the upper and lower directions, could be obtained.

The present liquid crystal display device is provided with two optical retardation plates 2 and 3, one on each side of the liquid crystal display element 1, but viewing angle characteristics like the foregoing can also be obtained with a single optical retardation plate. When only one optical retardation plate is used, balanced improvement of viewing angle characteristics in the upper and lower directions can be obtained, but viewing angle characteristics to the left and right are outside the scope of improvement. When two optical retardation plates are used, however, viewing angle characteristics in the upper and lower directions can be improved as when one optical retardation plate is used, and viewing angle characteristics to the left and right are also brought within the scope of improvement, and can be improved as with those in the upper and lower directions.

Figure 9:
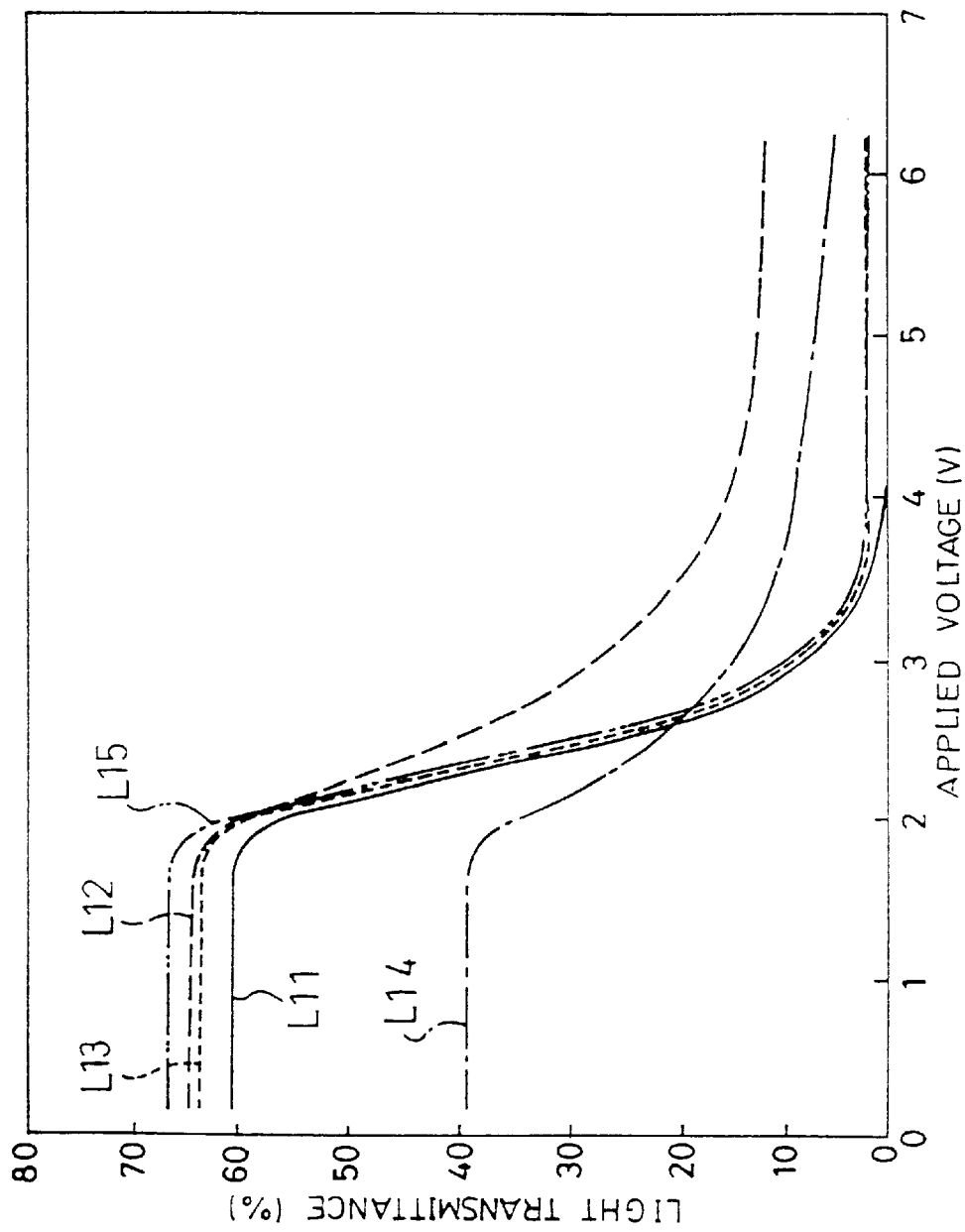
FIG. 9 is a graph showing light transmittance/applied voltage characteristics of a liquid crystal display device according to a comparative example of Example 1 having a liquid crystal layer alignment division ratio of 1:1.

Here, for the purposes of comparison, a comparative sample #101, in which the ratio of the first division 8a to the second division 8b was 1:1, was prepared and placed in the measurement system shown in FIG. 7, and viewing angle dependence was measured. FIG. 9 shows a graph of the measured light transmittance/applied voltage characteristics.

In FIG. 9, curve L11, shown by a solid line, shows the characteristics in the z axis direction; curve L12, shown by a dashed line, shows the characteristics in the lower direction; curve L13, shown by a dotted line, shows the characteristics to the right; curve L14, shown by a dot-and-dash line, shows the characteristics in the upper direction; and curve L15, shown by a two-dot-and-dash line, shows the characteristics to the left.

As the results confirm, in the right and left directions, light transmittance was sufficiently low in the ON state, and there were no problems with viewing angle characteristics. In the upper and lower directions, however, it was confirmed that light transmittance was not sufficiently lowered in the ON state. Thus, the liquid crystal display device according to the present comparative example is subject to viewing angle dependence in the upper and lower directions.

EXAMPLE 2

In the present example, samples #11 through #15 were prepared, using, in the liquid crystal cell 16 of the liquid crystal display device shown in FIG. 1, a liquid crystal layer 8 having a division ratio of 17:3 and a cell gap (thickness) of 5 μm, and using liquid crystal materials and optical retardation plates 2 and 3 for which the relation shown in equation (1) below is set to 0, 0.10, 0.17, 0.20, and 0.23, respectively. Here, $\Delta n_L(450)$ is anisotropy of the refractive index of the liquid crystal material in response to light of 450 nm wavelength, $\Delta n_L(550)$ is anisotropy of the refractive index of the liquid crystal material in response to light of 550 nm wavelength, $\Delta n_F(450)$ is anisotropy of the refractive index of the optical retardation plates 2 and 3 in response to light of 450 nm wavelength, and $\Delta n_F(550)$ is anisotropy of the refractive index of the optical retardation plates 2 and 3 in response to light of 550 nm wavelength.

$$\frac{(\Delta n_L(450)/\Delta n_L(550))-1}{(\Delta n_F(450)/\Delta n_F(550))-1} \quad \text{(Equation 1)}$$

Further, the optical retardation plates 2 and 3 used in samples #11 through #15 were the same as the optical retardation plates 2 and 3, with discotic liquid crystal in an inclined alignment, used in Example 1.

Again, as comparative examples, comparative samples #201 through #203 were prepared, using, in the liquid crystal cell 16 of the liquid crystal display device shown in FIG. 1, a liquid crystal layer 8 having a division ratio of 17:3, and using liquid crystal materials and optical retardation plates 2 and 3 for which the relation shown in equation (1) above is set to 0.25, 0.50, and 0.60, respectively. Comparative samples #201 through #203 were otherwise equivalent to the samples in the present example.

Table 1 shows the results of viewing tests, under white light, of the foregoing samples #11 through #15 and comparative samples #201 through #203.

TABLE 1

| | $\frac{(\Delta n_L(450)/\Delta n_L(550))-1}{(\Delta n_F(450)/\Delta n_F(550))-1}$ | | | | | | | |
|---|---|---|---|---|---|---|---|---|
| VIEWING ANGLE (θ) | 0 #11 | 0.10 #12 | 0.17 #13 | 0.20 #14 | 0.23 #15 | 0.25 #201 | 0.50 #202 | 0.60 #203 |
| 50° | ○ | ○ | ○ | ○ | ○ | x | x | x |
| 60° | ○ | ○ | ○ | Δ | x | x | x | x |
| 70° | ○ | ○ | ○ | x | x | x | x | x |

○: NO COLORING; Δ: SOME COLORING, BUT ACCEPTABLE FOR USE; x: COLORING TO AN EXTENT UNACCEPTABLE FOR USE

Samples #11 through #13 had good image quality, and no coloring when viewed from any direction, at viewing angles of up to 70°. Sample #14 had good image quality, and no coloring when viewed from any direction, at viewing angles of up to 50°, but at a viewing angle of 60°, slight coloring was found when viewed from the right and left directions. However, this coloring was within limits acceptable for use. Sample #15 had good image quality, and no coloring when viewed from any direction, at viewing angles of up to 50°, but at a viewing angle of 60°, coloring to an extent unacceptable for use was found when viewed from the right and left directions.

With samples #201 through #203, in contrast, even at a viewing angle of 50°, yellow or orange coloring to an extent unacceptable for use was found when viewed from the right and left directions.

Further, results equivalent to those above were obtained with samples and comparative samples which were equivalent to samples #11 through #15 and comparative samples #201 through #203, except that the optical retardation plates 2 and 3 were made of discotic liquid crystal in a hybrid alignment on a transparent supporting body.

EXAMPLE 3

In the present example, samples #21 through #25 were prepared, using, in the liquid crystal cell 16 of the liquid crystal display device shown in FIG. 1, a liquid crystal layer 8 having a division ratio of 17:3 and a cell gap (thickness) of 5 μm, and using liquid crystal materials and optical retardation plates 2 and 3 for which the relation shown in equation (1) below is set to 0, 0.10, 0.18, 0.20, and 0.23, respectively. Here, $\Delta n_L(650)$ is anisotropy of the refractive index of the liquid crystal material in response to light of 650 nm wavelength, $\Delta n_L(550)$ is anisotropy of the refractive index of the liquid crystal material in response to light of 550 nm wavelength, $\Delta n_F(650)$ is anisotropy of the refractive index of the optical retardation plates 2 and 3 in response to light of 650 nm wavelength, and $\Delta n_F(550)$ is anisotropy of the refractive index of the optical retardation plates 2 and 3 in response to light of 550 nm wavelength.

$$\frac{(\Delta n_L(650)/\Delta n_L(550))-1}{(\Delta n_F(650)/\Delta n_F(550))-1} \quad \text{(Equation 2)}$$

Further, the optical retardation plates 2 and 3 used in samples #21 through #25 were the same as the optical retardation plates 2 and 3, with discotic liquid crystal in an inclined alignment, used in Example 1.

Again, as comparative examples, comparative samples #301 through #303 were prepared, using, in the liquid crystal cell 16 of the liquid crystal display device shown in FIG. 1, a liquid crystal layer 8 having a division ratio of 17:3, and using liquid crystal materials and optical retardation plates 2 and 3 for which the relation shown in equation (2) above is set to 0.25, 0.50, and 0.60, respectively. Comparative samples #301 through #303 were otherwise equivalent to the samples in the present example.

Table 2 shows the results of viewing tests, under white light, of the foregoing samples #21 through #25 and comparative samples #301 through #303.

TABLE 2

| | $\frac{(\Delta n_L(650)/\Delta n_L(550))-1}{(\Delta n_F(650)/\Delta n_F(550))-1}$ | | | | | | | |
|---|---|---|---|---|---|---|---|---|
| VIEWING ANGLE (θ) | 0 #21 | 0.10 #22 | 0.18 #23 | 0.20 #24 | 0.23 #25 | 0.25 #301 | 0.50 #302 | 0.60 #303 |
| 50° | ○ | ○ | ○ | ○ | ○ | x | x | x |
| 60° | ○ | ○ | ○ | Δ | x | x | x | x |
| 70° | ○ | ○ | ○ | x | x | x | x | x |

○: NO COLORING; Δ: SOME COLORING, BUT ACCEPTABLE FOR USE; x: COLORING TO AN EXTENT UNACCEPTABLE FOR USE

Samples #21 through #23 had good image quality, and no coloring when viewed from any direction, at viewing angles of up to 70°. Sample #24 had good image quality, and no coloring when viewed from any direction, at viewing angles of up to 50°, but at a viewing angle of 60°, slight coloring was found when viewed from the right and left directions. However, this coloring was within limits acceptable for use. Sample #25 had good image quality, and no coloring when viewed from any direction, at viewing angles of up to 50°, but at a viewing angle of 60°, coloring to an extent unacceptable for use was found when viewed from the right and left directions.

With samples #301 through #303, in contrast, even at a viewing angle of 50°, yellow or orange coloring to an extent unacceptable for use was found when viewed from the right and left directions.

Further, results equivalent to those above were obtained with samples and comparative samples which were equivalent to samples #21 through #25 and comparative samples #301 through #303, except that the optical retardation plates 2 and 3 were made of discotic liquid crystal in a hybrid alignment on a transparent supporting body.

EXAMPLE 4

In the present example, samples #31 through #33 were prepared, using, in the liquid crystal cell 16 of the liquid crystal display device shown in FIG. 1, alignment films 11 and 14 made of Nippon Synthetic Rubber Co. product Optomer-AL, and a liquid crystal layer 8 having a cell gap (thickness) of 5 μm and a division ratio of 17:3, and made of liquid crystal materials with a pre-tilt angle of 6° with respect to the alignment films 11 and 14, and anisotropy of the refractive index in response to light of 550 nm wavelength $\Delta n_L(550)$ of 0.070, 0.080, and 0.095, respectively.

In order to measure pre-tilt angle, a homogeneous cell filled with the liquid crystal material of each sample #31 through #33 was prepared, and measurement was made using the pre-tilt angle measuring device NSMAP-3000.

Further, the optical retardation plates 2 and 3 used in samples #31 through #33 were the same as the optical retardation plates 2 and 3, with discotic liquid crystal in an inclined alignment, used in Example 1.

Each of the foregoing samples #31 through #33 was placed in the measurement system shown in FIG. 7, and, with the photodetector 21 secured at a fixed angle φ, output level of the photodetector 21 in response to a voltage applied to each sample #31 through #33 was measured.

Assuming that the y direction is the left side of the screen, and the x direction the bottom of the screen (standard viewing angle direction), measurement was performed with the photodetector 21 positioned in an upper (opposite viewing angle) direction, in a lower (standard viewing angle) direction, to the left, and to the right, with the angle φ of the photodetector 21 fixed at 50°.

Figure 10A:
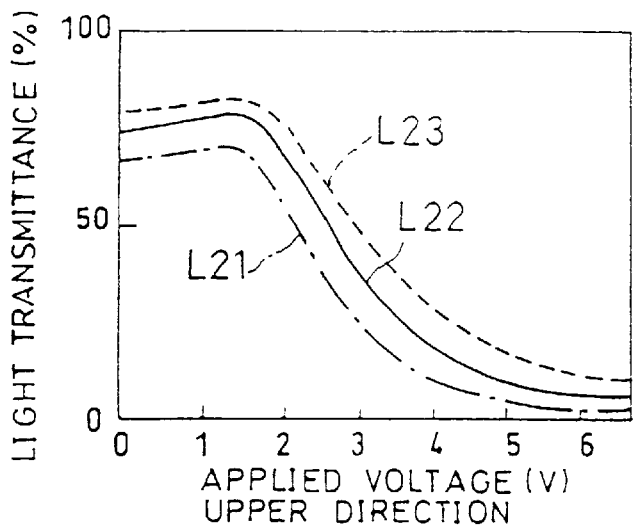
FIGS. 10(a) through 10(c) are graphs showing light transmittance/applied voltage characteristics of a liquid crystal display device according to Example 4.
Figure 10B:
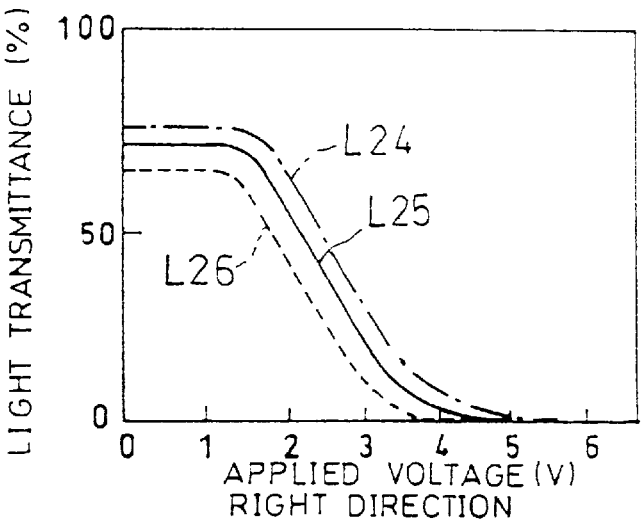
Figure 10C:
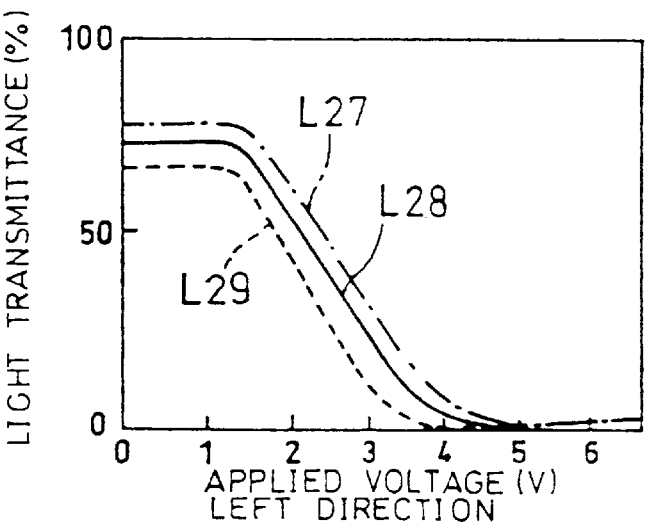

The results of measurement are shown in FIGS. 10(a) through 10(c). FIGS. 10(a) through 10(c) are graphs showing light transmittance according to voltage applied (light transmittance/applied voltage characteristics) for samples #31 through #33.

In FIGS. 10(a) through 10(c), curves L21, L24, and L27, shown by dot-and-dash lines, show the results for sample #31, which uses in the liquid crystal layer 8 a liquid crystal material in which $\Delta n_L(550)$=0.070; curves L22, L25, and L28, shown by solid lines, show the results for sample #32, which uses a liquid crystal material in which $\Delta n_L(550)$=0.080; and curves L23, L26, and L29, shown by dashed lines, show the results for sample #33, which uses a liquid crystal material in which $\Delta n_L(550)$=0.095.

Again, as comparative examples, comparative samples #401 and #402 were prepared, using, in the liquid crystal cell 16 of the liquid crystal display device shown in FIG. 1, a liquid crystal layer 8 having a division ratio of 17:3, and using liquid crystal materials having anisotropy of the refractive index in response to light of 550 nm wavelength $\Delta n_L(550)$ of 0.060 and 0.120, respectively. Comparative samples #401 and #402 were otherwise equivalent to the samples in the present example. Each of the comparative samples #401 and #402 was placed in the measurement system shown in FIG. 7, and, as with the samples, with the photodetector 21 secured at a fixed angle φ, output level of the photodetector 21 in response to a voltage applied to each comparative sample #401 and #402 was measured.

Assuming that the y direction is the left side of the screen, and the x direction the bottom of the screen (standard viewing angle direction), measurement was performed in the same way as with the samples, with the photodetector 21 positioned in an upper (opposite viewing angle) direction, in a lower (standard viewing angle) direction, to the left, and to the right, with the angle φ of the photodetector 21 fixed at 50°.

Figure 11A:
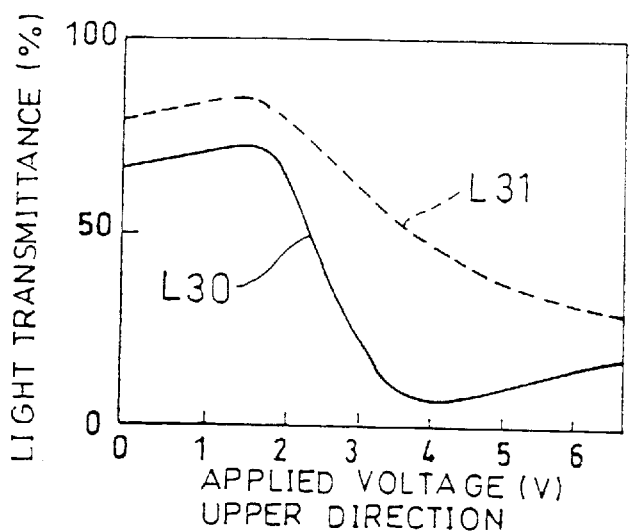
FIGS. 11(a) through 11(c) are graphs showing light transmittance/applied voltage characteristics of a liquid crystal display device according to a comparative example of Example 4.
Figure 11B:
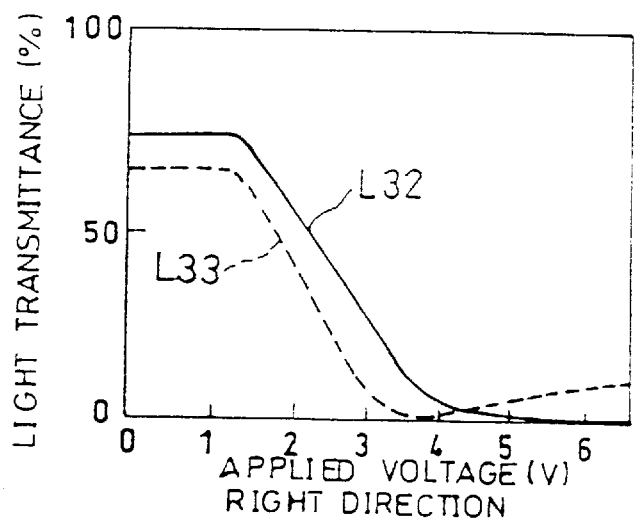
Figure 11C:
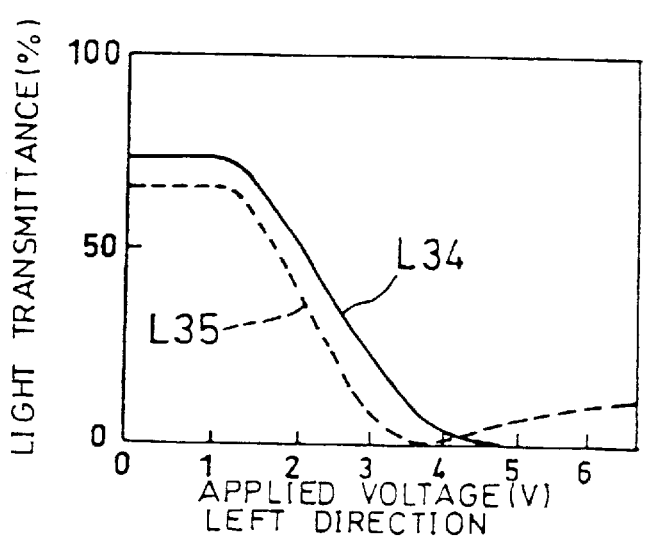
Figure 12:
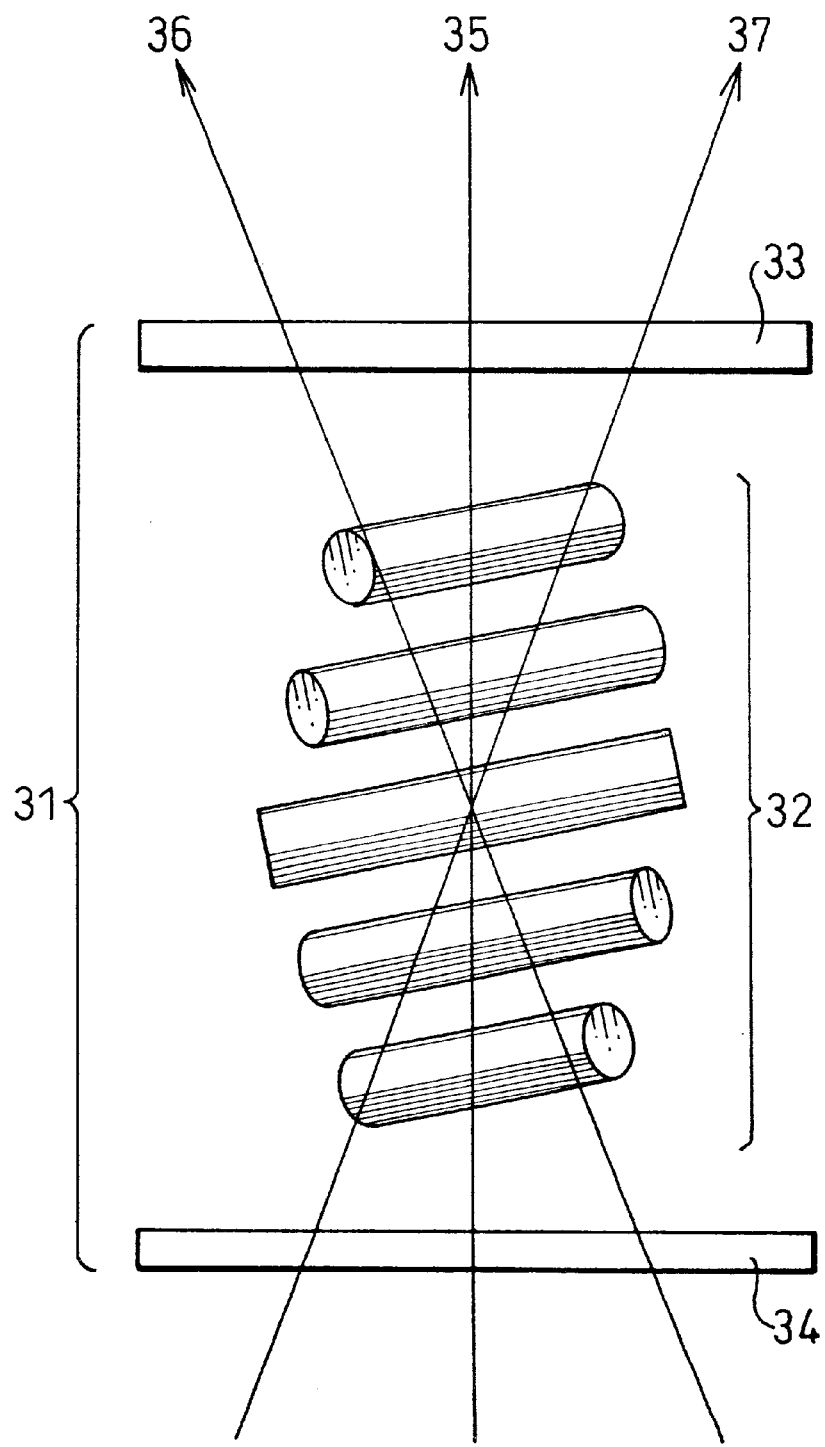
FIG. 12 is a drawing schematically showing a twisted alignment of liquid crystal molecules of a TN liquid crystal display element.

The results of measurement are shown in FIGS. 11(a) through 11(c). FIGS. 11(a) through 11(c) are graphs showing light transmittance according to voltage applied (light transmittance/applied voltage characteristics) for comparative samples #401 and #402.

FIG. 11(a) shows the results of measurement in the upper direction in FIG. 5, FIG. 11(b) the results of measurement to the right in FIG. 5, and FIG. 11(c) the results of measurement to the left in FIG. 5.

In FIGS. 11(a) through 11(c), curves L30, L32, and L34, shown by solid lines, show the results for comparative sample #401, which uses in the liquid crystal layer 8 a liquid crystal material in which $\Delta n_L(550)$=0.060, and curves L31, L33, and L35, shown by broken lines, show the results for comparative sample #402, which uses a liquid crystal material in which $\Delta n_L(550)$=0.120.

In comparing light transmittance/applied voltage characteristics in the upper direction for the samples and comparative samples of the present example, it can be seen from the curves L21, L22, and L23 in FIG. 10(a) that, in samples #31 through #33, light transmittance is sufficiently reduced with increase in voltage. In comparative sample #402, in contrast, as can be seen by comparing the curve L31 in FIG. 11(a) with the curves L21, L22, and L23 in FIG. 10(a), light transmittance is not sufficiently reduced as voltage increases. Further, it can be seen from the curve L30 that comparative sample #401 showed reversal phenomenon, in which, as voltage increases, light transmittance at first decreases, but then increases again.

In the same way, in comparing light transmittance/applied voltage characteristics to the right for the samples and comparative samples, it can be seen from the curves L24, L25, and L26 in FIG. 10(b) that, in samples #31 through #33, light transmittance is reduced to nearly zero with increase in voltage. Further, the curve L32 in FIG. 11(b) shows that in comparative sample #401, light transmittance is reduced to nearly zero with increase in voltage, as in FIG. 10(b), but as the curve L33 shows, comparative sample #402 was subject to reversal phenomenon.

In the same way, in comparing light transmittance/applied voltage characteristics to the left for the samples and comparative samples, it can be seen from the curves L27, L28, and L29 in FIG. 10(c), and from the curve L34 in FIG. 11(c), that, in samples #31 through #33 and comparative sample #401, light transmittance is reduced to nearly zero with increase in voltage. However, as the curve L35 in FIG. 11(c) shows, comparative sample #402 was subject to reversal phenomenon.

Further, viewing confirmation under white light was performed for samples #31 through #33 and comparative samples #401 and #402.

Samples #31 through #33, and comparative sample #401, had good image quality, and no coloring when viewed from any direction, at a viewing angle of 50°. With comparative sample #402, in contrast, at a viewing angle of 50°, yellow or orange coloring was found when viewed from the right and left directions.

From the foregoing results, as shown in FIGS. 10(a) through 10 (c), it can be seen that when the liquid crystal material used in the liquid crystal layer 8 has anisotropy of the refractive index in response to light of 550 nm wavelength $\Delta n_L(550)$ of 0.070, 0.080, or 0.095, light transmittance is sufficiently reduced as applied voltage increases, and no reversal phenomenon is evident, thus expanding the viewing angle field, and since coloring phenomenon does not occur, display quality of the liquid crystal display device is greatly improved.

On the other hand, as shown in FIGS. 11(a) through 11(c), it can be seen that when the liquid crystal material used in the liquid crystal layer 8 has anisotropy of the refractive index in response to light of 550 nm wavelength $\Delta n_L(550)$ of 0.060 or 0.120, viewing angle characteristics are not sufficiently improved.

Further, results equivalent to those above were obtained with samples and comparative samples which were equivalent to samples #31 through #33 and comparative samples #401 and #402, except that the optical retardation plates 2 and 3 were made of discotic liquid crystal in a hybrid alignment on a transparent supporting body.

In addition, by varying the angle of inclination θ of the index ellipsoid of the optical retardation plates 2 and 3, the dependence of light transmittance/applied voltage characteristics on the angle of inclination θ was investigated. This investigation found that, provided the angle of inclination θ was within a range of 15°≦θ≦75°, characteristics basically did not change, regardless of the alignment of the discotic liquid crystal in the optical retardation plates 2 and 3. Incidentally, it was found that if the angle of inclination θ was outside the foregoing range, the viewing angle field was not expanded in the opposite viewing angle direction.

In addition, the dependence of light transmittance/applied voltage characteristics on the second retardation value of the optical retardation plates 2 and 3 was investigated by varying the second retardation value. This investigation found that, provided the second retardation value was within a range of 80 nm through 250 nm, characteristics basically did not change, regardless of the alignment of the discotic liquid crystal in the optical retardation plates 2 and 3. Incidentally, it was found that if the second retardation value was outside the foregoing range, the viewing angle field was not expanded in the horizontal (right and left) viewing angle directions.

In addition, based on the results of the viewing tests of comparative samples #401 and #402, samples #34 through #36 were prepared, using, in the liquid crystal cell 16 of the liquid crystal display device shown in FIG. 1, a liquid crystal layer 8 made of liquid crystal materials having anisotropy of the refractive index in response to light of 550 nm wavelength $\Delta n_L(550)$ of 0.065, 0.100, and 0.115, respectively. Samples #34 through #36 were otherwise equivalent to the other samples in the present example. Using the measurement system shown in FIG. 7, with the photodetector 21 secured at a fixed angle φ, output level of the photodetector 21 in response to a voltage applied to the samples #34 through #36 was measured. A viewing confirmation of each sample under white light was also performed.

As a result, with samples #35 and #36, in which anisotropy of the refractive index $\Delta n_L(550)$ was 0.100 and 0.115, respectively, when the angle θ was 50°, a slight increase in light transmittance in the right and left directions was found when the voltage was increased. However, when viewed, there was no reversal phenomenon, and this amount of increase in light transmittance was acceptable for use. There were no problems in the upper direction for either sample #35 or #36.

Again, with sample #34, in which anisotropy of the refractive index $\Delta n_L(550)$ was 0.065, as with comparative sample #401 shown in FIG. 11(a), increasing voltage in the upper direction resulted in a curve in which light transmittance first decreases and then increases. However, this increase in light transmittance was smaller than in the case of comparative sample #401, and was acceptable for use. There were no problems in the right and left directions for sample #34.

Further, in a viewing investigation, slight yellow to orange coloring was found with samples #35 and #36, but not enough to be a problem. With sample #34, slight bluish coloring was found. However, this amount of bluish coloring was not a problem.

In addition, as a supplemental comparison, during white display under application of a voltage of approximately 1V, light transmittance in the normal direction of the liquid crystal cell 16 was measured for sample #34 and comparative sample #401. As a result, with comparative sample #401, a decrease in light transmittance unacceptable for use was found. With sample #34, in contrast, a slight decrease in light transmittance was found, but this decrease was of an extent acceptable for use.

As discussed above, a liquid crystal display device according to a first structure of the present invention is made up of a liquid crystal display element which includes a pair of transparent substrates provided, on respective facing surfaces thereof, with transparent electrodes and alignment films, and a liquid crystal layer filling a space between the transparent substrates; a pair of polarizers, one provided on each side of the liquid crystal display element; and at least one optical retardation plate, provided between the liquid crystal display element and one of the polarizers, which has an inclined index ellipsoid; in which the alignment films align the liquid crystal in a different direction in each of a plurality of liquid crystal layer divisions of unequal area into which each pixel is divided, and respective extents of variation in response to wavelength of light of (i) anisotropy of the refractive index of a liquid crystal material of the liquid crystal layer and (ii) anisotropy of the refractive index of the optical retardation plate(s) are set to within a range such that viewing-angle-dependent coloring of the liquid crystal screen does not occur.

By this means, in the foregoing liquid crystal display device, fluctuation in phase difference in the liquid crystal display element can be improved beyond the compensation effect of the optical retardation plate alone, and coloring of the screen can be better prevented. In addition, the difference between the opposite viewing angle characteristics in the standard and opposite viewing angle directions can be eliminated, and viewing angle characteristics in both viewing angle directions can be brought into closer conformity. Thus impairment of contrast and the tendency for the displayed image to appear in white, which occur when viewing angle is inclined upward or downward, can be suppressed nearly uniformly.

Consequently, since the contrast ratio during black-and-white display is not influenced by the viewing angle of the viewer, use of the foregoing liquid crystal display device has the effect of greatly improving the quality of the display image in comparison with conventional liquid crystal display devices.

Further, a liquid crystal display device according to a second structure of the present invention is made up of a liquid crystal display element, which includes a pair of transparent substrates, provided with, on respective facing surfaces thereof, transparent electrodes and alignment films, and a liquid crystal layer, aligned with a twist of approximately 90°, filling a space between the transparent substrates; a pair of polarizers, one provided on each side of the liquid crystal display element; and at least one optical retardation plate, provided between the liquid crystal display element and one of the polarizers, having an index ellipsoid whose three principal refractive indices $n_a$, $n_b$, and $n_c$ have a relation $n_a = n_c > n_b$, the index ellipsoid inclining because the directions of (a) the principal refractive index $n_b$, which is parallel to the normal direction of the surface of the optical retardation plate, and (b) the principal refractive index $n_c$ or $n_a$, which is in-plane with respect to the surface of the optical retardation plate, incline in a clockwise or counterclockwise direction with respect to an axis which is the direction of the refractive index $n_a$ or $n_c$; in which the alignment films align the liquid crystal in a different direction in each of a plurality of liquid crystal layer divisions of unequal area into which each pixel is divided, and respective extents of variation in response to wavelength of light of (i) anisotropy of the refractive index of a liquid crystal material of the liquid crystal layer and (ii) anisotropy of the refractive index of the optical retardation plate(s) are set to within a range such that viewing-angle-dependent coloring of the liquid crystal screen does not occur.

By this means, in the foregoing liquid crystal display device, fluctuation in phase difference in the liquid crystal display element can be improved beyond the compensation effect of the optical retardation plate alone, and coloring of the screen can be better prevented. In addition, the difference between the opposite viewing angle characteristics in the standard and opposite viewing angle directions can be eliminated, and viewing angle characteristics in both viewing angle directions can be brought into closer conformity. Thus impairment of contrast and the tendency for the displayed image to appear in white, which occur when the viewing angle is inclined upward or downward, can be suppressed nearly uniformly.

Consequently, since the contrast ratio during black-and-white display is not influenced by the viewing angle of the viewer, use of the foregoing liquid crystal display device has the effect of greatly improving the quality of the display image in comparison with conventional liquid crystal display devices.

Further, in the liquid crystal display devices having the first and second structures above, a ratio $\Delta n_L(450)/\Delta n_L(550)$, which is a ratio of $\Delta n_L(450)$, anisotropy of the refractive index of the liquid crystal material of the liquid crystal layer in response to light of 450 nm wavelength, to $\Delta n_L(550)$, anisotropy of the refractive index of the liquid crystal material in response to light of 550 nm wavelength; and a ratio $\Delta n_F(450)/\Delta n_F(550)$, which is a ratio of $\Delta n_F(450)$, anisotropy of the refractive index of the optical retardation plate(s) in response to light of 450 nm wavelength, to $\Delta n_F(550)$, anisotropy of the refractive index of the optical retardation plate(s) in response to light of 550 nm wavelength, are set so as to satisfy:

$$0 \le \frac{(\Delta n_L(450)/\Delta n_L(550)) - 1}{(\Delta n_F(450)/\Delta n_F(550)) - 1} < 0.25$$

By this means, in the foregoing liquid crystal display devices, at the 50° viewing angle required of ordinary liquid crystal display devices, when viewing from whatever direction, it is possible to suppress coloring of the liquid crystal screen to an extent fully acceptable for use.

Further, the foregoing liquid crystal display devices are structured so as to also satisfy:

$$0 \le \frac{(\Delta n_L(450)/\Delta n_L(550)) - 1}{(\Delta n_F(450)/\Delta n_F(550)) - 1} \le 0.17$$

By this means, in the foregoing liquid crystal display devices, at a wider viewing angle of 70°, when viewing from whatever direction, display completely free of coloring of the liquid crystal screen can be attained.

Further, in the liquid crystal display devices having the first and second structures above, a ratio $\Delta n_L(650)/\Delta n_L(550)$, which is a ratio of $\Delta n_L(650)$, anisotropy of the refractive index of the liquid crystal material of the liquid crystal layer in response to light of 650 nm wavelength, to $\Delta n_L(550)$, anisotropy of the refractive index of the liquid crystal material in response to light of 550 nm wavelength; and a ratio $\Delta n_F(650)/\Delta n_F(550)$, which is a ratio of $\Delta n_F(650)$, anisotropy of the refractive index of the optical retardation plate(s) in response to light of 650 nm wavelength, to $\Delta n_F(550)$, anisotropy of the refractive index of the optical retardation plate(s) in response to light of 550 nm wavelength, are set so as to satisfy:

$$0 \le \frac{(\Delta n_L(650)/\Delta n_L(550)) - 1}{(\Delta n_F(650)/\Delta n_F(550)) - 1} < 0.25$$

By this means, in the foregoing liquid crystal display devices, at the 50° viewing angle required of ordinary liquid crystal display devices, when viewing from whatever direction, it is possible to suppress coloring of the liquid crystal screen to an extent fully acceptable for use.

Further, the foregoing liquid crystal display devices are structured so as to also satisfy:

$$0 \le \frac{(\Delta n_L(650)/\Delta n_L(550)) - 1}{(\Delta n_F(650)/\Delta n_F(550)) - 1} \le 0.18$$

By this means, in the foregoing liquid crystal display devices, at a wider viewing angle of 70°, when viewing from whatever direction, display completely free of coloring of the liquid crystal screen can be attained.

Further, in the liquid crystal display devices having the first and second structures above, $\Delta n(550)$, which is anisotropy of the refractive index of the liquid crystal material of the liquid crystal layer in response to light of 550 nm wavelength, is set within a range of more than 0.060 and less than 0.120.

By this means, phase differences corresponding to viewing angle which arise in the liquid crystal display element can be resolved, and thus not only coloring phenomenon occurring in the liquid crystal screen depending on viewing angle, but also contrast fluctuation, reversal phenomenon in the right and left viewing angle directions, etc. can be further improved.

Consequently, use of the foregoing liquid crystal display device has the effect of further improving the quality of the display image.

Further, in the foregoing liquid crystal display devices, $\Delta n_L(550)$, which is anisotropy of the refractive index of the liquid crystal material of the liquid crystal layer in response to light of 550 nm wavelength, is set within a range of more than 0.070 and less than 0.095, and thus viewing-angle-based contrast fluctuations, reversal phenomenon in the right and left directions, etc. can be further improved, which has the effect of realizing excellent display image quality.

Further, in the liquid crystal display devices having the first and second structures above, the angle of inclination of the index ellipsoid of each optical retardation plate is set within a range of 15° through 75°.

By setting the angle of inclination of the index ellipsoid of each optical retardation plate provided in the liquid crystal display device within a range of 15° through 75°, the aforementioned effect of the optical retardation plate, of compensating the phase difference, can be obtained with certainty, which has the effect of definitely improving the visibility of the liquid crystal display device according to the present invention.

Further, in the liquid crystal display devices having the first and second structures above, in each optical retardation plate, $(n_a-n_b) \times d$, which is a product of a difference between the principal refractive indices $n_a$ and $n_b$ and the thickness d of the optical retardation plate, is set within a range from 80 nm through 250 nm.

By setting $(n_a-n_b) \times d$, which is a product of a difference between the principal refractive indices $n_a$ and $n_b$ and the thickness d of the optical retardation plate, within a range from 80 nm through 250 nm for each optical retardation plate provided in the liquid crystal display device, the aforementioned effect of the optical retardation plate, of compensating the phase difference, can be obtained with certainty, which has the effect of definitely improving the visibility of the liquid crystal display device according to the present invention.

Further, in the liquid crystal display devices having the first and second structures above, each optical retardation plate is provided such that, in the largest of the liquid crystal layer divisions in a given pixel, the direction in which the liquid crystal molecules in the vicinity of the inner surface of the alignment layer incline when a voltage is applied by the transparent electrodes is opposite the direction of incline of the index ellipsoid.

By this means, in the foregoing liquid crystal display devices, the optical retardation plate can compensate the bias in optical characteristics which arises since the liquid crystal molecules near the inner surface of the alignment layer do not tilt up even when a voltage is applied.

Consequently, reversal phenomenon when viewing angle is inclined in the standard viewing angle direction can be suppressed, and a good display image, which will not black out, can be obtained. Further, impairment of contrast when viewing angle is inclined in the opposite viewing angle direction can be suppressed, and thus a good display image, which will not appear in white, can be obtained. Moreover, reversal phenomenon in the right and left viewing angle directions can be suppressed.

Consequently, use of the foregoing liquid crystal display devices has the effect of improving with greater certainty the viewing angle characteristics of the liquid crystal display device according to the present invention.

Further, in the liquid crystal display devices having the first and second structures above, the ratio in size of the first liquid crystal layer division to the second liquid crystal layer division is set within a range from 7:3 through 9:1, which has the effect of improving viewing angle characteristics so as to obtain good viewing angle characteristics which are balanced in the upper and lower viewing angle directions.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A liquid crystal display device comprising:

a liquid crystal display element, which includes a pair of transparent substrates provided with alignment films on respective facing surfaces thereof, and a liquid crystal layer filling a space between said transparent substrates;

a pair of polarizers, one provided in each side of said liquid crystal display element;

at least one optical retardation plate, provided between said liquid crystal display element and one of said polarizers, having an index ellipsoid which inclines;

wherein said alignment films align liquid crystal molecules of said liquid crystal layer in a different direction in each of a plurality of liquid crystal layer divisions of unequal area into which each pixel is divided; and wherein said liquid crystal layer and said at least one optical retardation plate are set such that a relationship $$\frac{(\Delta n_L(\lambda_1)/\Delta n_L(\lambda_2))-1}{(\Delta n_F(\lambda_1)/\Delta n_F(\lambda_2))-1}$$

is set within a range such that viewing-angle-dependent coloring of an image displayed on said liquid crystal element does not occur, where $\Delta n_L(\lambda_1)$ is anisotropy of the refractive index of said liquid crystal material of said liquid crystal layer in response to light having a wavelength of $\lambda_1$, $\Delta n_L(\lambda_2)$ is anisotropy of the refractive index of said liquid crystal material of said liquid crystal layer in response to light having a wavelength of $\lambda_2$, $\Delta n_F(\lambda_1)$ is anisotropy of the refractive index of said at least one optical retardation plate in response to light having a wavelength of $\lambda_1$, and $\Delta n_F(\lambda_2)$ is anisotropy of the refractive index of said at least one optical retardation plate in response to light having a wavelength of $\lambda_2$.

2. The liquid crystal display device set forth in claim 1, wherein:

in each said optical retardation plate, three principal refractive indices $n_a$, $n_b$, and $n_c$ of the index ellipsoid have a relation $n_a=n_c>n_b$, and the principal refractive index $n_b$ inclines with respect to a normal direction of the surface of said optical retardation plate.

3. The liquid crystal display device set forth in claim 1, wherein:

a ratio $\Delta n_L(450)/\Delta n_L(550)$, which is a ratio of $\Delta n_L(450)$, anisotropy of the refractive index of said liquid crystal material of said liquid crystal layer in response to light of 450 nm wavelength, to $\Delta n_L(550)$, anisotropy of the refractive index of said liquid crystal material in response to light of 550 nm wavelength; and a ratio $\Delta n_F(450)/\Delta n_F(550)$, which is a ratio of $\Delta n_F(450)$, anisotropy of the refractive index of said optical retardation plate(s) in response to light of 450 nm wavelength, to $\Delta n_F(550)$, anisotropy of the refractive index of said optical retardation plate(s) in response to light of 550 nm wavelength, are set so as to satisfy:

$$0 \leq \frac{(\Delta n_L(450)/\Delta n_L(550))-1}{(\Delta n_F(450)/\Delta n_F(550))-1} < 0.25.$$

4. The liquid crystal display device set forth in claim 3, wherein:

a ratio $\Delta n_L(450)/\Delta n_L(550)$, which is a ratio of $\Delta n_L(450)$, anisotropy of the refractive index of said liquid crystal material of said liquid crystal layer in response to light of 450 nm wavelength, to $\Delta n_L(550)$ anisotropy of the refractive index of said liquid crystal material in response to light of 550 nm wavelength; and a ratio $\Delta n_F(450)/\Delta n_F(550)$, which is a ratio of $\Delta n_F(450)$, anisotropy of the refractive index of said optical retardation plate(s) in response to light of 450 nm wavelength, to $\Delta n_F(550)$, anisotropy of the refractive index of said optical retardation plate(s) in response to light of 550 nm wavelength, are set so as to satisfy:

$$0 \leq \frac{(\Delta n_L(450)/\Delta n_L(550))-1}{(\Delta n_F(450)/\Delta n_F(550))-1} \leq 0.17.$$

5. The liquid crystal display device set forth in claim 3, wherein:

$\Delta n_L(550)$, which is anisotropy of the refractive index of said liquid crystal material of said liquid crystal layer in response to light of 550 nm wavelength, is set within a range of more than 0.060 and less than 0.120.

6. The liquid crystal display device set forth in claim 5, wherein:

$\Delta n_L(550)$, which is anisotropy of the refractive index of said liquid crystal material of said liquid crystal layer in response to light of 550 nm wavelength, is set within a range of more than 0.070 and less than 0.095.

7. The liquid crystal display device set forth in claim 3, wherein:

in each said optical retardation plate, the angle of inclination of the index ellipsoid is set within a range of 15° through 75°.

8. The liquid crystal display device set forth in claim 3, wherein:

in each said optical retardation plate, $(n_a - n_b) \times d$, which is a product of a difference between the principal refractive index $n_a$ and the principal refractive index $n_b$ and a thickness d of said optical retardation plate, is set within a range from 80 nm through 250 nm.

9. The liquid crystal display device set forth in claim 1, wherein:

a ratio $\Delta n_L(650)/\Delta n_L(550)$, which is a ratio of $\Delta n_L(650)$, anisotropy of the refractive index of said liquid crystal material of said liquid crystal layer in response to light of 650 nm wavelength, to $\Delta n_L(550)$, anisotropy of the refractive index of said liquid crystal material in response to light of 550 nm wavelength; and a ratio $\Delta n_F(650)/\Delta n_F(550)$, which is a ratio of $\Delta n_F(650)$, anisotropy of the refractive index of said optical retardation plate(s) in response to light of 650 nm wavelength, to $\Delta n_F(550)$, anisotropy of the refractive index of said optical retardation plate(s) in response to light of 550 nm wavelength, are set so as to satisfy:

$$0 \leq \frac{(\Delta n_L(650)/\Delta n_L(550))-1}{(\Delta n_F(650)/\Delta n_F(550))-1} < 0.25.$$

10. The liquid crystal display device set forth in claim 9, wherein:

a ratio $\Delta n_L(650)/\Delta n_L(550)$, which is a ratio of $\Delta n_L(650)$, anisotropy of the refractive index of said liquid crystal material of said liquid crystal layer in response to light of 650 nm wavelength, to $\Delta n_L(550)$, anisotropy of the refractive index of said liquid crystal material in response to light of 550 nm wavelength; and a ratio $\Delta n_F(650)/\Delta n_F(550)$, which is a ratio of $\Delta n_F(650)$, anisotropy of the refractive index of said optical retardation plate(s) in response to light of 650 nm wavelength, to $\Delta n_F(550)$, anisotropy of the refractive index of said optical retardation plate(s) in response to light of 550 nm wavelength, are set so as to satisfy:

$$0 \leq \frac{(\Delta n_L(650)/\Delta n_L(550))-1}{(\Delta n_F(650)/\Delta n_F(550))-1} \leq 0.18.$$

11. The liquid crystal display device set forth in claim 9, wherein:

$\Delta n_L(550)$, which is anisotropy of the refractive index of said liquid crystal material of said liquid crystal layer in response to light of 550 nm wavelength, is set within a range of more than 0.060 and less than 0.120.

12. The liquid crystal display device set forth in claim 11, wherein:

$\Delta n_L(550)$, which is anisotropy of the refractive index of said liquid crystal material of said liquid crystal layer in response to light of 550 nm wavelength, is set within a range of more than 0.070 and less than 0.095.

13. The liquid crystal display device set forth in claim 9, wherein:

in each said optical retardation plate, the angle of inclination of the index ellipsoid is set within a range of 15° through 75°.

14. The liquid crystal display device set forth in claim 9, wherein:

in each said optical retardation plate, $(n_a - n_b) \times d$, which is a product of a difference between the principal refractive index $n_a$ and the principal refractive index $n_b$ and a thickness d of said optical retardation plate, is set within a range from 80 nm through 250 nm.

15. The liquid crystal display device set forth in claim 1, wherein:

$\Delta n_L(550)$, which is anisotropy of the refractive index of said liquid crystal material of said liquid crystal layer in response to light of 550 nm wavelength, is set within a range of more than 0.060 and less than 0.120.

16. The liquid crystal display device set forth in claim 15, wherein:

$\Delta n_L(550)$, which is anisotropy of the refractive index of said liquid crystal material of said liquid crystal layer in response to light of 550 nm wavelength, is set within a range of more than 0.070 and less than 0.095.

17. The liquid crystal display device set forth in claim 1, wherein:

in each said optical retardation plate, the angle of inclination of the index ellipsoid is set within a range of 15° through 75°.

18. The liquid crystal display device set forth in claim 1, wherein:

in each said optical retardation plate, $(n_a-n_b) \times d$, which is a product of a difference between the principal refractive index $n_a$ and the principal refractive index $n_b$, and a thickness d of said optical retardation plate, is set within a range from 80 nm through 250 nm.

19. The liquid crystal display device set forth in claim 1, wherein:

each said optical retardation plate is provided such that, in the largest of said liquid crystal layer divisions in a given pixel, a direction in which the liquid crystal molecules in the vicinity of an inner surface of said alignment film incline when a voltage is applied by said transparent electrodes is opposite to a direction in which the index ellipsoid inclines.

20. The liquid crystal display device set forth in claim 19, wherein:

said liquid crystal layer divisions are a first liquid crystal layer division and a second liquid crystal layer division smaller than said first liquid crystal layer division, and a ratio of area of said first liquid crystal layer division to area of said second liquid crystal layer division is set within a range from 6:4 through 19:1.

21. The liquid crystal display device set forth in claim 20, wherein:

the ratio of area of said first liquid crystal layer division to area of said second liquid crystal layer is set within a range from 7:3 through 9:1.

22. The liquid crystal display device set forth in claim 1, wherein:

the liquid crystal molecules of said liquid crystal layer are aligned with a twist of approximately 90°.

23. A liquid crystal display device comprising:

a liquid crystal display element, which includes a pair of transparent substrates provided with alignment films on respective facing surfaces thereof, and a liquid crystal layer, liquid crystal molecules of which are aligned with a twist of approximately 90, filing a space between said transparent substrates;

a pair of polarizers, one provided in each side of said liquid crystal display element;

at least one optical retardation plate, provided between said liquid crystal display element and one of said polarizers, having an index ellipsoid whose three principal refractive indices $n_a$, $n_b$, and $n_c$ have a relation $n_a = n_c$ $n_b$, the index ellipsoid inclining because the directions of (a) the principal refractive index $n_b$, which is parallel to the normal direction of the surface of said optical retardation plate, and (b) the principal refractive index $n_a$ or $n_c$, which is in-plane with respect to the surface of said optical; retardation plate, incline in a clockwise or counter-clockwise direction with respect to an axis which is in the direction of the refractive index $n_a$ or $n_c$;

wherein said alignment films align liquid crystal molecules of said liquid crystal layer in a different direction in each of a plurality of liquid crystal layer divisions of unequal area into which each pixel is divided; and wherein said liquid crystal layer and said at least one optical retardation plate are set such that a relationship $$\frac{(\Delta n_L(\lambda_1)/\Delta n_L(\lambda_2)) - 1}{(\Delta n_F(\lambda_1)/\Delta n_F(\lambda_2)) - 1}$$

is set within a range such that viewing-angle-dependent coloring of an image displayed on said liquid crystal element does not occur, where $\Delta n_L(\lambda_1)$ is anisotropy of the refractive index of said liquid crystal material of said liquid crystal layer in response to light having a wavelength of $\lambda_1$, $\Delta n_L(\lambda_2)$ is anisotropy of the refractive index of said liquid crystal material of said liquid crystal layer in response to light having a wavelength of $\lambda_2$, $\Delta n_F(\lambda_1)$ is anisotropy of the refractive index of said at least one optical retardation plate in response to light having a wavelength of $\lambda_1$, and $\Delta n_F(\lambda_2)$ is anisotropy of the refractive index of said at least one optical retardation plate in response to light having a wavelength of $\lambda_2$.

24. A liquid crystal display device comprising:

a liquid crystal display element, which includes a pair of transparent substrates provided with alignment films on respective facing surfaces thereof, and a liquid crystal layer filling a space between said transparent substrates;

a pair of polarizers, one provided in each side of said liquid crystal display element;

at least one optical retardation plate, provided between said liquid crystal display element and one of said polarizers, having an index ellipsoid which inclines;

wherein said alignment films align liquid crystal molecules of said liquid crystal layer in a different direction in each of a plurality of liquid crystal layer divisions of unequal area into which each pixel is divided; and wherein a ratio $\Delta n_L(450)/\Delta n_L(550)$, which is a ratio of $\Delta n_L$ (450), anisotropy of the refractive index of said liquid crystal material of said liquid crystal layer in response to light of 450 nm wavelength, to $\Delta n_L(550)$, anisotropy of the refractive index of said liquid crystal material of said liquid crystal layer in response to light of 550 nm wavelength; and a ratio $\Delta n_F(450)/\Delta n_F(550)$, which is a ratio of $\Delta n_F(450)$, anisotropy of the refractive index of said optical retardation plate(s) in response to light of 450 nm wavelength, to $\Delta n_F(550)$, anisotropy of the refractive index of said optical retardation plate(s) in response to light of 550 nm wavelength, are set so as to satisfy:

$$0 \leq \frac{(\Delta n_L(450)/\Delta n_L(550)) - 1}{(\Delta n_F(450)/\Delta n_F(550)) - 1} < 0.25.$$

25. A liquid crystal display device comprising:

a liquid crystal display element, which includes a pair of transparent substrates provided with alignment films on respective facing surfaces thereof, and a liquid crystal layer filling a space between said transparent substrates;

a pair of polarizers, one provided in each side of said liquid crystal display element;

at least one optical retardation plate, provided between said liquid crystal display element and one of said polarizers, having an index ellipsoid which inclines;

wherein said alignment films align liquid crystal molecules of said liquid crystal layer in a different direction in each of a plurality of liquid crystal layer divisions of unequal area into which each pixel is divided; and wherein a ratio $\Delta n_L(650)/\Delta n_L(550)$, which is a ratio of $\Delta n_L(650)$, anisotropy of the refractive index of said liquid crystal material of said liquid crystal layer in response to light of 650 nm wavelength, to $\Delta n_L(550)$, anisotropy of the refractive index of said liquid crystal material of said liquid crystal layer in response to light of 550 nm wavelength; and a ratio $\Delta n_F(650)/\Delta n_F(550)$, which is a ratio of $\Delta n_F(650)$, anisotropy of the refractive index of said optical retardation plate(s) in response to light of 650 nm wavelength, to $\Delta n_F(550)$, anisotropy of the refractive index of said optical retardation plate(s) in response to light of 550 nm wavelength, are set so as to satisfy:

$$0 \leq \frac{(\Delta n_L(650)/\Delta n_L(550)) - 1}{(\Delta n_F(650)/\Delta n_F(550)) - 1} < 0.25.$$

* * * * *

UNITED STATES PATENT AND TRADEMARK OFFICE
CERTIFICATE OF CORRECTION

PATENT NO. : 6,373,542 B1
DATED : April 16, 2002
INVENTOR(S) : Yamahara et al.

It is certified that error appears in the above-identified patent and that said Letters Patent is hereby corrected as shown below:

<u>Title page,</u>
Item [56], References Cited, FOREIGN PATENT DOCUMENTS, change "JP     56-97315      8/1981" to -- JP     56-97318      8/1981 --.

Signed and Sealed this

Twenty-ninth Day of October, 2002

*Attest:*

JAMES E. ROGAN
*Attesting Officer*     *Director of the United States Patent and Trademark Office*